(12) United States Patent
Kasami et al.

(10) Patent No.: US 7,551,548 B2
(45) Date of Patent: Jun. 23, 2009

(54) OFDM DEMODULATION APPARATUS, METHOD AND COMPUTER READABLE MEDIUM

(75) Inventors: Hideo Kasami, Yokohama (JP); Hidehiro Matsuoka, Yokohama (JP); Makoto Tsuruta, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 628 days.

(21) Appl. No.: 11/387,966

(22) Filed: Mar. 24, 2006

(65) Prior Publication Data
US 2006/0285482 A1 Dec. 21, 2006

(30) Foreign Application Priority Data
Jun. 21, 2005 (JP) ............... 2005-180746
Sep. 14, 2005 (JP) ............... 2005-267029

(51) Int. Cl.
*H04J 11/00* (2006.01)
(52) U.S. Cl. ............................... 370/208
(58) Field of Classification Search ............... None
See application file for complete search history.

(56) References Cited
U.S. PATENT DOCUMENTS
2006/0285482 A1   12/2006   Kasami et al.

FOREIGN PATENT DOCUMENTS
JP   2004-165990   6/2004
JP   2004-229198   8/2004

OTHER PUBLICATIONS

Mertins, Design of filterbank transceivers for dispersive channels with arbitrary-length impulse response, Journal of Telecommunications and Information Technology, 6 pages, 2003.*
Yamamura et al, High Mobility OFDM Transmission System by a New Channel Estimation and ISI Cancellation Scheme using Characteristics of Pilot Symbol Inserted OFDM Signal, IEEE, 5 pages, 1999.*
U.S. Appl. No. 11/619,385, filed Jan. 3, 2007, Kasami.

(Continued)

*Primary Examiner*—Frank Duong
(74) *Attorney, Agent, or Firm*—Oblon, Spivak, McClelland, Maier & Neustadt, P.C.

(57) ABSTRACT

Orthogonal frequency division multiplexing demodulation apparatus includes: antenna to receive signal including holding period including part of period ranging from leading portion of delayed wave of maximum-delay time to trailing portion of preceding wave, unit estimating channel response of signal received by antenna, unit holding, based on channel response, first-signal component contained in holding period, first-signal component including second-signal component which is contained in period of preset length which is included in holding period, unit acquiring filter-bank outputs by subjecting second-signal component to frequency conversion, unit generating replicas for each of filter-bank outputs, based on estimated-channel response, frequency response of each of filter-bank outputs, and candidates for modulation signal corresponding to subcarrier included in each of filter-bank outputs, unit selecting one of replicas which minimizes quantity corresponding to differences between components of each of filter-bank outputs and components of replicas, and unit determining modulation signal based on selected replica.

16 Claims, 19 Drawing Sheets

OTHER PUBLICATIONS

U.S. Appl. No. 11/268,657, filed Nov. 8, 2005, Kasami et al.
U.S. Appl. No. 11/387,966, filed Mar. 24, 2006, Kasami et al.
U.S. Appl. No. 12/052,171, filed Mar. 20, 2008, Tsuruta et al.

Noriyoshi Suzuki, et al., "A New OFDM Demodulation Method with Variable-Length Effective Symbol and ICI Canceller", IEICE Trans. Fundamentals, vol. E85-A, No. 12, Dec. 2002, pp. 2859-2867.

* cited by examiner

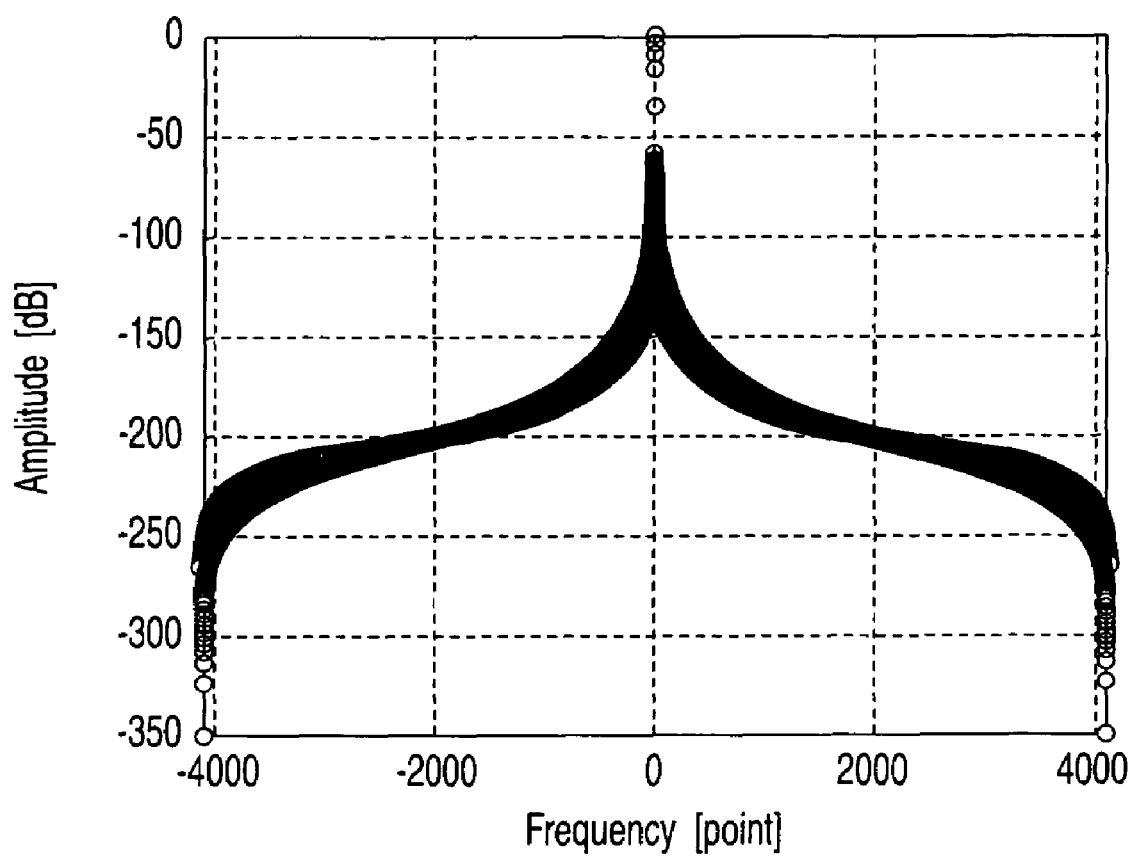
F I G. 3

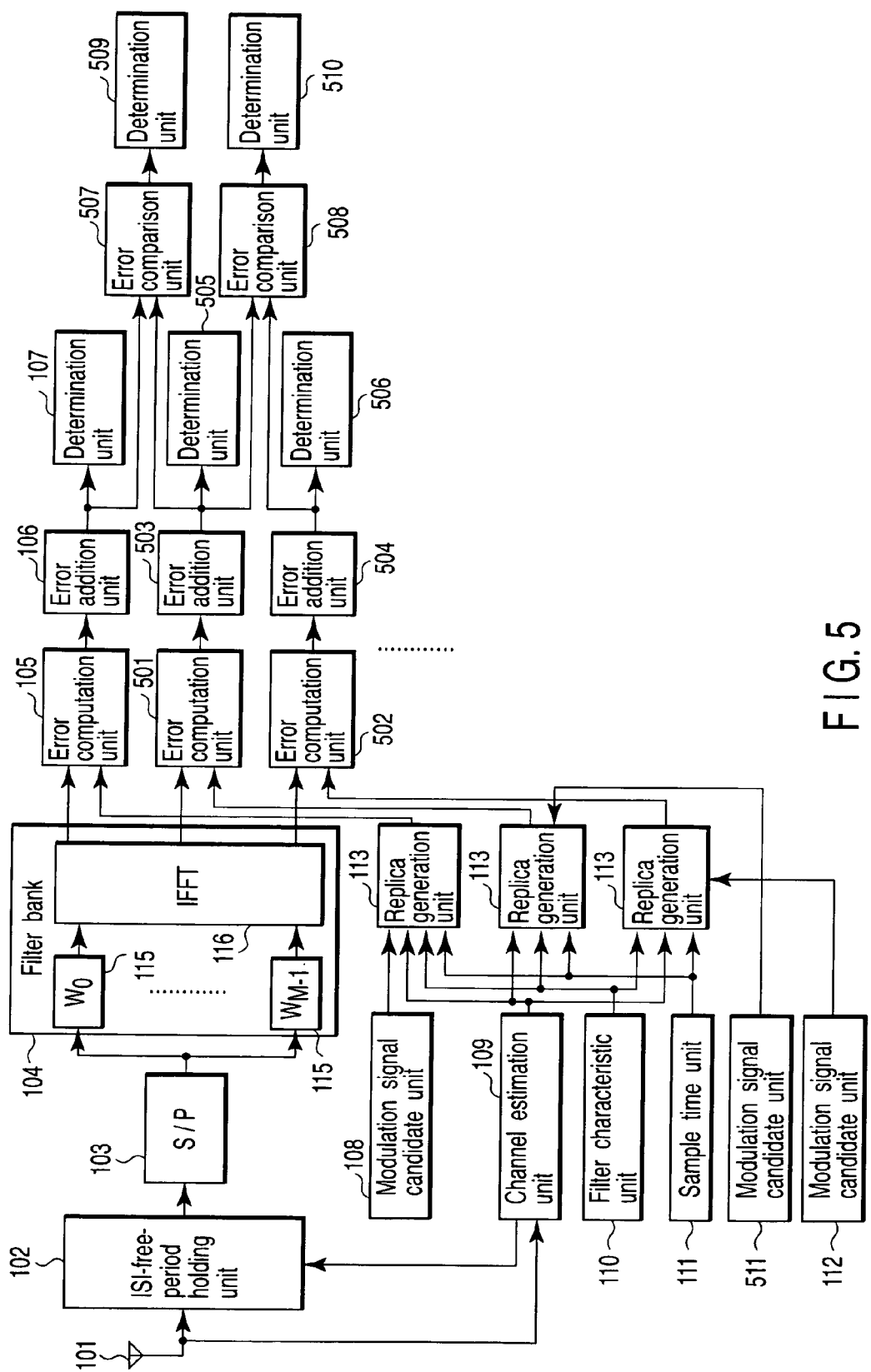
F I G. 5

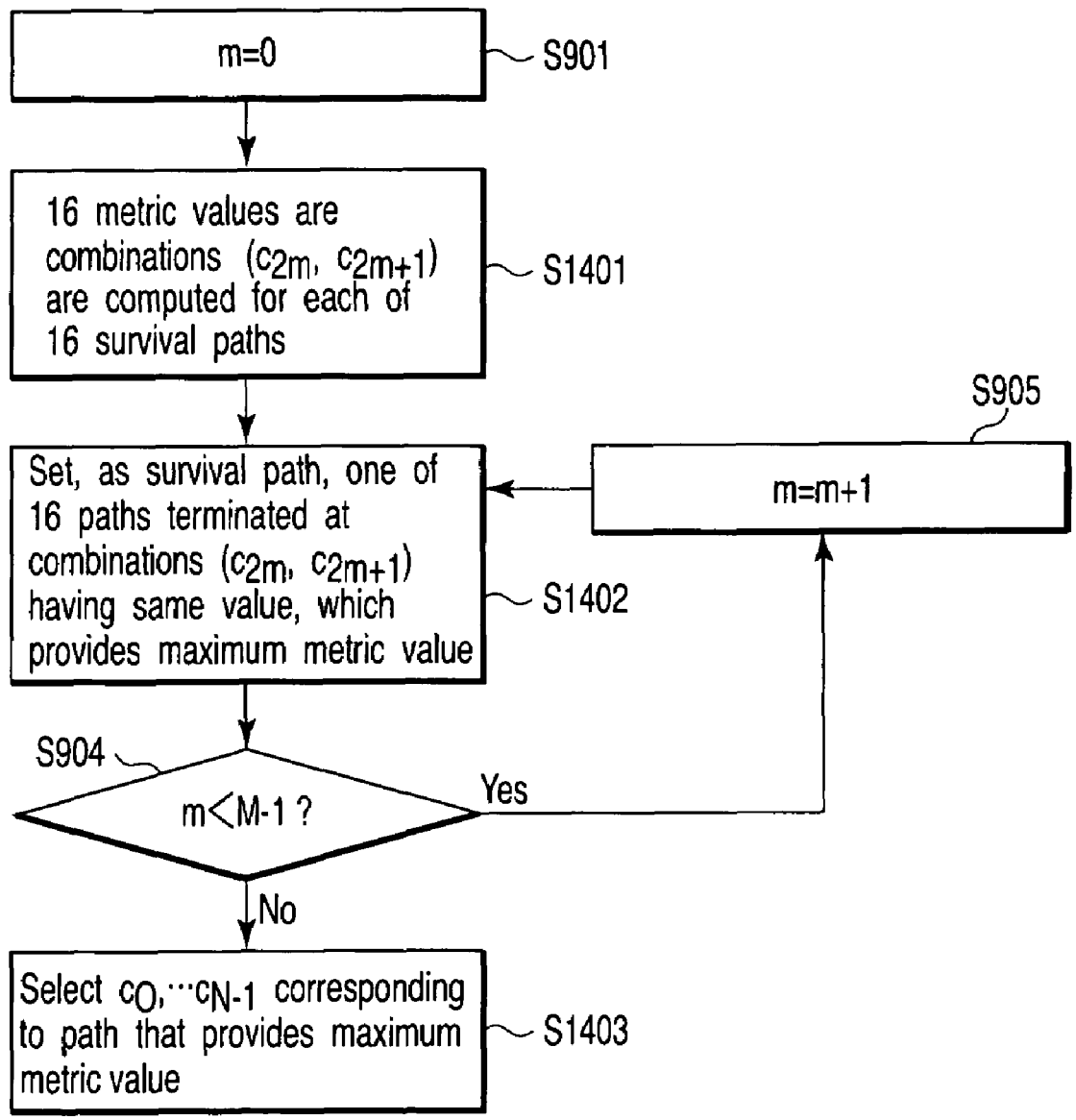
F I G. 14

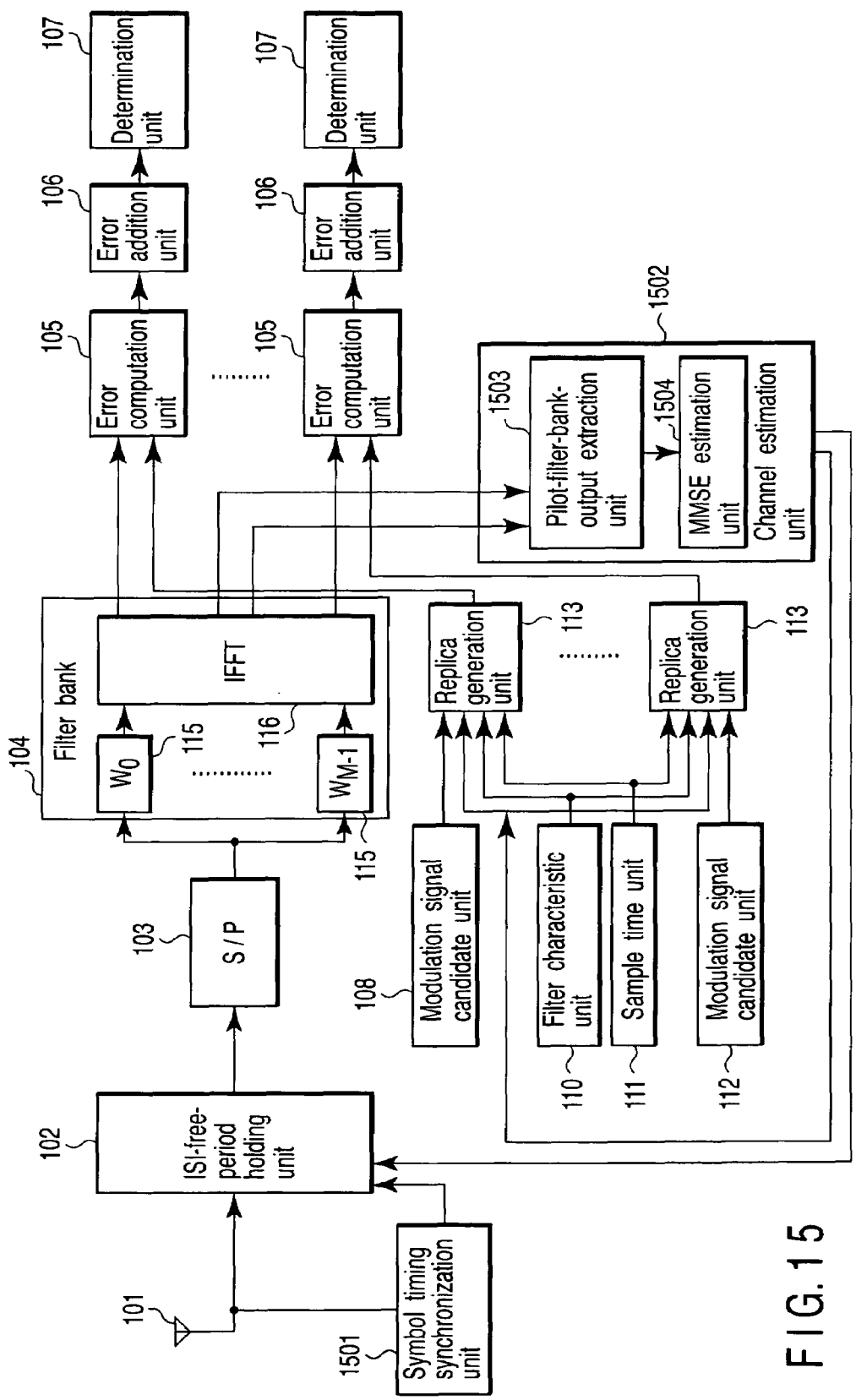
F I G. 15

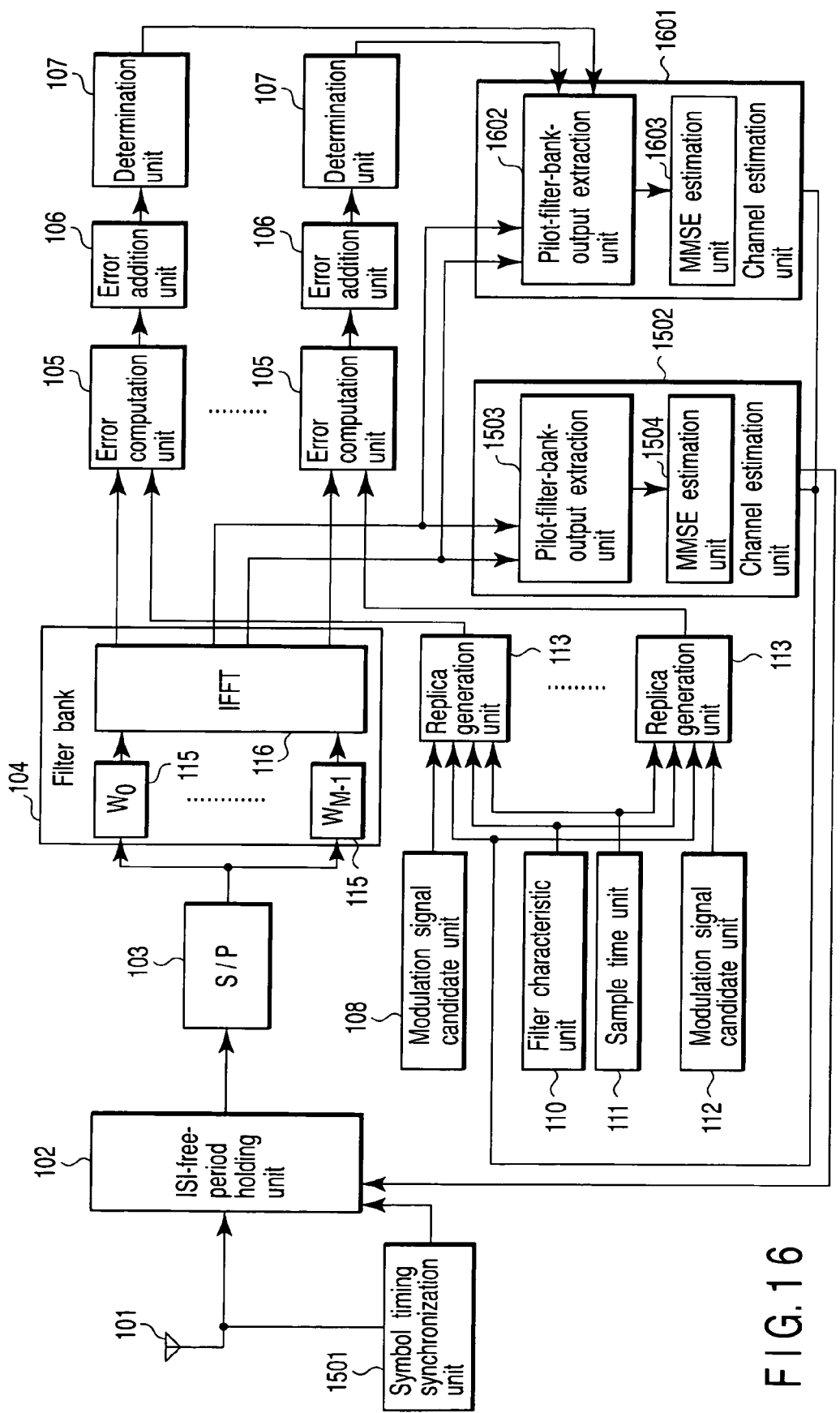
F I G. 16

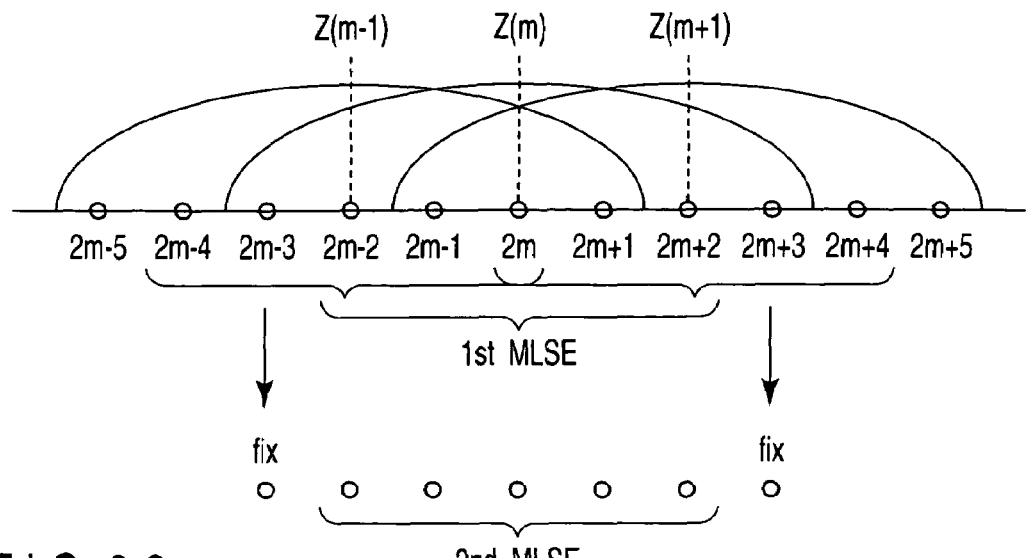
F I G. 26
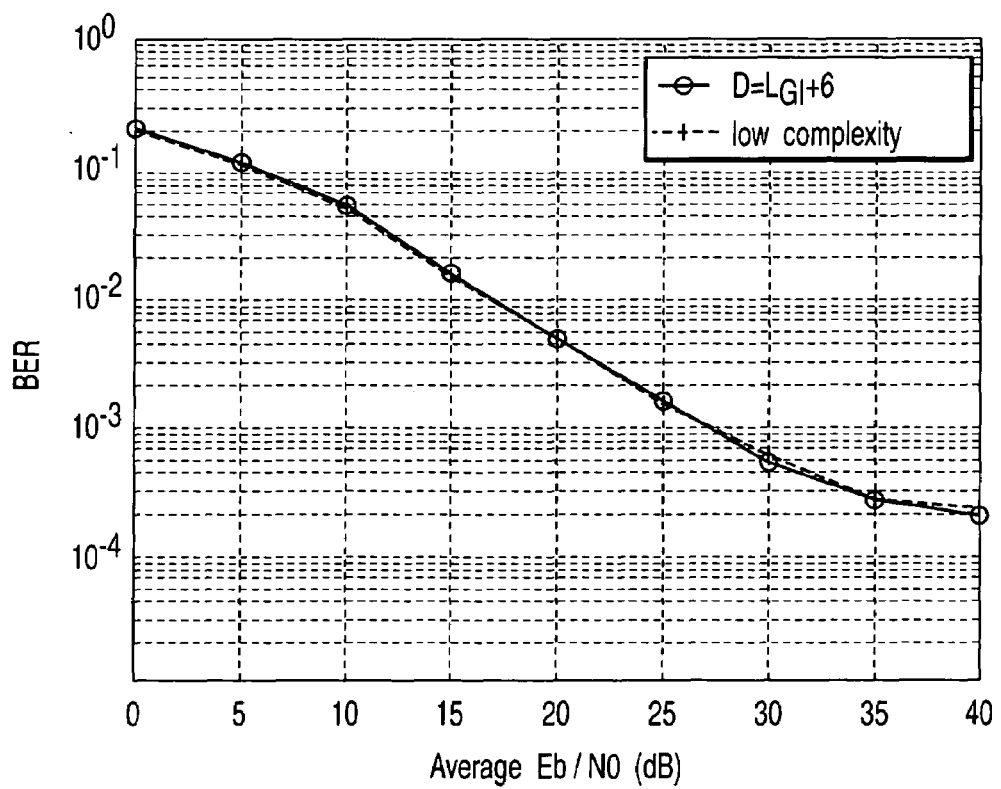
F I G. 27

US 7,551,548 B2

OFDM DEMODULATION APPARATUS, METHOD AND COMPUTER READABLE MEDIUM

CROSS-REFERENCE TO RELATED APPLICATIONS

This application is based upon and claims the benefit of priority from prior Japanese Patent Applications No. 2005-180746, filed Jun. 21, 2005; and No. 2005-267029, filed Sep. 14, 2005, the entire contents of both of which are incorporated herein by reference.

BACKGROUND OF THE INVENTION

1. Field of the Invention

The present invention relates to an orthogonal frequency division multiplexing (OFDM) demodulation apparatus, method and computer readable medium for reducing interference by a delayed wave that is longer than a guard interval.

2. Description of the Related Art

A conventional equalizer for overcoming a delayed wave that is longer than a guard interval eliminates such a delayed wave. A feedback type equalizer, for example, is used as such an equalizer (see, for instance, Jpn. Pat. Appln. KOKAI Publication No. 2004-165990).

Concerning OFDM channel estimation, in general, all points included in an effective symbol are subjected to fast Fourier transform, thereby extracting pilot subcarrier components and performing channel estimation.

However, the above demodulation apparatus does not have satisfactory delayed-wave elimination performance.

Further, since a received signal of an effective symbol period (N points) is used for channel estimation, both inter-symbol interference (interference between the present and preceding symbols) and inter-subcarrier interference occur, with the result that the accuracy of channel estimation is degraded.

BRIEF SUMMARY OF THE INVENTION

In accordance with a first aspect of the invention, there is provided an orthogonal frequency division multiplexing (OFDM) demodulation apparatus comprising: an antenna to receive a signal including a holding period, the holding period including part of a period ranging from a leading portion of a delayed wave of a maximum delay time to a trailing portion of a preceding wave; an estimation unit configured to estimate a channel response of the signal received by the antenna; a holding unit configured to hold, based on the channel response, a first signal component contained in the holding period, the first signal component including a second signal component which is contained in a period of a preset length which is included in the holding period; an acquisition unit configured to acquire a set of filter bank outputs by subjecting the second signal component to frequency conversion; a generation unit configured to generate a plurality of replicas for each of the filter bank outputs, based on the estimated channel response, a frequency response of each of the filter bank outputs, and candidates for a modulation signal corresponding to a subcarrier included in each of the filter bank outputs; a selection unit configured to select one of the replicas which minimizes a quantity corresponding to differences between components of each of the filter bank outputs and components of the replicas; and a determination unit configured to determine the modulation signal based on the replica selected for each of the filter bank outputs.

In accordance with a second aspect of the invention, there is provided an orthogonal frequency division multiplexing (OFDM) demodulation method comprising: estimating a channel response of a signal including a holding period, the holding period including part of a period ranging from a leading portion of a delayed wave of a maximum delay time to a trailing portion of a preceding wave; holding, based on the channel response, a first signal component contained in the holding period, the first signal component including a second signal component which is contained in a period of a preset length which is included in the holding period; acquiring a set of filter bank outputs by subjecting the second signal component to frequency conversion; generating a plurality of replicas for each of the filter bank outputs, based on the estimated channel response, a frequency response of each of the filter bank outputs, and candidates for a modulation signal corresponding to a subcarrier included in each of the filter bank outputs; selecting one of the replicas which minimizes a quantity corresponding to differences between components of each of the filter bank outputs and components of the replicas; and determining the modulation signal based on the replica selected for each of the filter bank outputs.

In accordance with a third aspect of the invention, there is provided a computer readable medium storing an orthogonal frequency division multiplexing (OFDM) demodulation program for causing a computer to execute instructions to perform steps of: estimating a channel response of a signal including a holding period, the holding period including part of a period ranging from a leading portion of a delayed wave of a maximum delay time to a trailing portion of a preceding wave; holding, based on the channel response, a first signal component contained in the holding period, the first signal component including a second signal component which is contained in a period of a preset length which is included in the holding period; acquiring a set of filter bank outputs by subjecting the second signal component to frequency conversion; generating a plurality of replicas for each of the filter bank outputs, based on the estimated channel response, a frequency response of each of the filter bank outputs, and candidates for a modulation signal corresponding to a subcarrier included in each of the filter bank outputs; selecting one of the replicas which minimizes a quantity corresponding to differences between components of each of the filter bank outputs and components of the replicas; and determining the modulation signal based on the replica selected for each of the filter bank outputs.

BRIEF DESCRIPTION OF THE SEVERAL VIEWS OF THE DRAWING

FIG. 3 is a graph illustrating a frequency response example of a window function employed in the apparatus of FIG. 1;

FIG. 5 is a block diagram illustrating an OFDM demodulation apparatus according to a second embodiment of the invention;

FIG. 14 is a flowchart illustrating the operation of the OFDM demodulation apparatus of FIG. 12;

FIG. 15 is a block diagram illustrating an OFDM demodulation apparatus according to a fifth embodiment of the invention;

FIG. 16 is a block diagram illustrating an OFDM demodulation apparatus according to a sixth embodiment of the invention;

FIG. 26 is a view useful in explaining the procedure of the process performed by the likelihood estimation unit appearing in FIG. 25; and FIG. 27 is a graph illustrating the bit-error-rate characteristic of the OFDM demodulation apparatuses of the eighth and ninth embodiments.

DETAILED DESCRIPTION OF THE INVENTION

Referring to the accompanying drawings, a detailed description will now be given of OFDM demodulation apparatuses, methods and computer readable medium according to embodiments of the invention. In the embodiments, like references denote like elements, and no duplicate description will be given thereof.

The OFDM demodulation apparatuses, methods and computer readable medium according to embodiments of the invention can reduce the number of computations and the interference due to a delayed wave that is longer than a guard interval, without degrading the channel estimation accuracy.

First Embodiment

Figure 1:
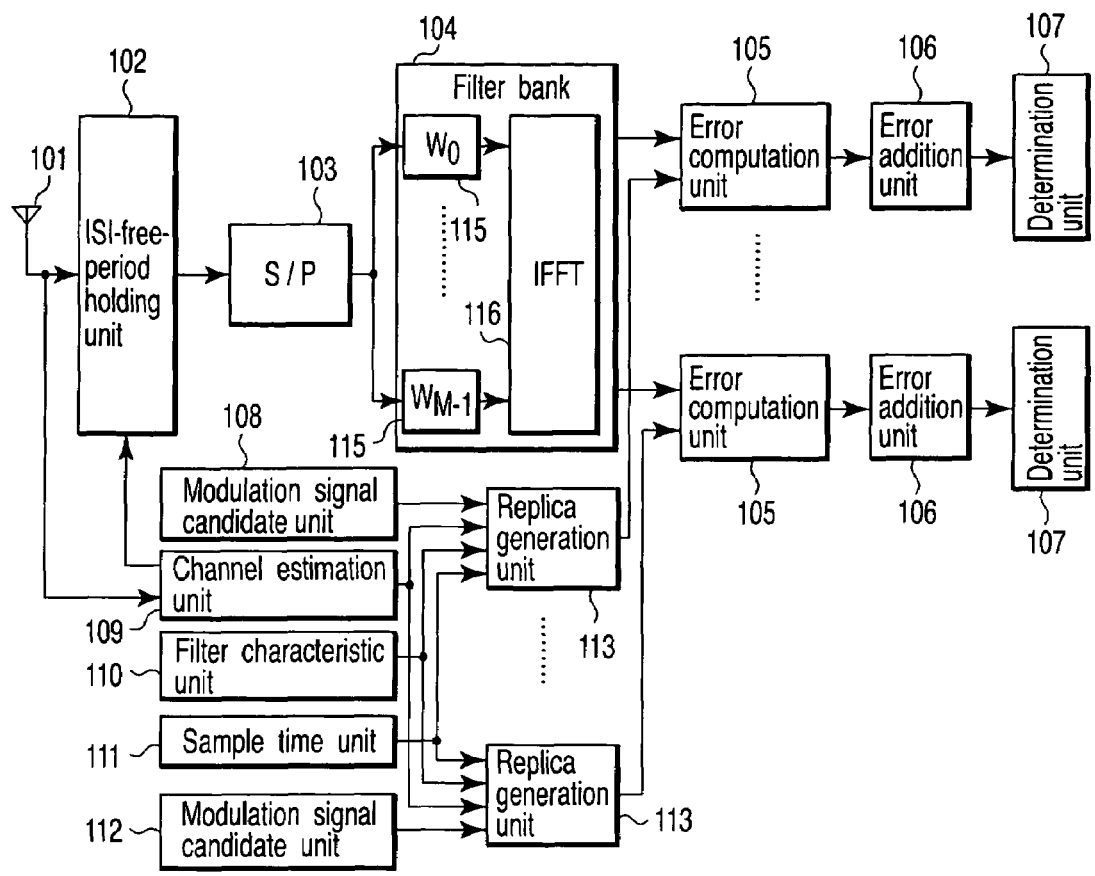
FIG. 1 is a block diagram illustrating an OFDM demodulation apparatus according to a first embodiment of the invention.
Figure 2:
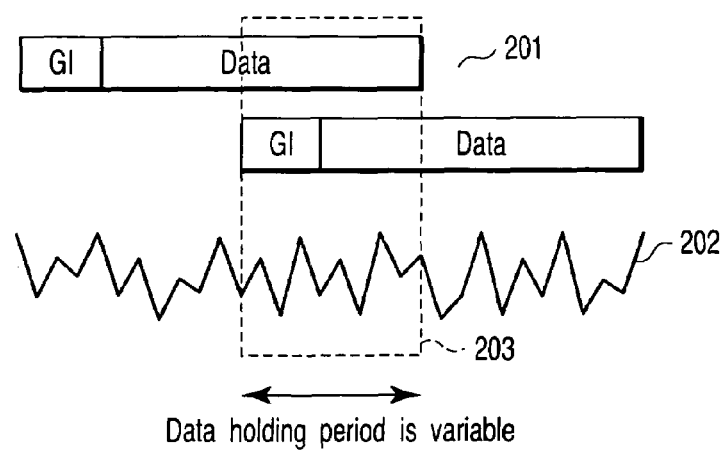
FIG. 2 is a view useful in explaining an ISI-free period.

Referring first to FIGS. 1 to 3, the OFDM demodulation apparatus of the first embodiment will be described.

The OFDM demodulation apparatus of the first embodiment comprises an antenna 101, ISI(Inter-Symbol Interference)-free-period holder 102, serial-to-parallel converter (S/P) 103, filter bank 104, error computation units 105, error addition units 106, modulation signal candidate units 108 and 112, channel estimation unit 109, filter characteristic unit 110, sample time unit 111 and replica generation units 113.

The antenna 101 receives an OFDM signal and outputs it to a low noise amplifier (LNA). The LNA amplifies the OFDM signal to a desired amplitude. A frequency converter converts the amplified OFDM signal into an intermediate frequency (IF) signal. A variable gain amplifier adjusts the frequency-converted OFDM signal to an appropriate signal level. An quadrature demodulator performs quadrature demodulation on the level-adjusted OFDM signal, thereby generating a baseband signal. An A/D converter converts the baseband signal into a digital signal. The LNA, frequency converter, variable gain amplifier, quadrature demodulator and A/D converter are well known devices and hence are not shown.

The channel estimation unit 109 receives the digital signal acquired by A/D converting the baseband signal, and estimates a channel response based on it. The channel estimation unit 109 outputs the estimated channel response value to the ISI-free-period holder 102. The channel estimation unit 109 estimates how degree each delayed wave is behind the leading wave in the OFDM signal.

The ISI-free-period holder 102 receives the estimated channel response value from the channel estimation unit 109, thereby determining the period in which the digital signal is held, and holding the digital signal in the determined holding period. The channel estimation unit 109 sets, as the holding period, part of the period (ISI free period) ranging from the leading portion of a delayed wave of a maximum delay time to the trailing portion of the preceding wave. For instance, in the case of the digital signal shown in FIG. 2 and indicated by reference numeral 201, the period ranging from the leading portion of a delayed wave of a maximum delay time to the trailing portion of the preceding wave is set as the holding period.

In the first embodiment, assume that the ISI-free-period length D is set to a value not less than the number M of points of the filter bank 104, described later. Further, assume that the ratio K of the number N of effective symbol points to the number M of the filter bank points is set to K=N/M. Furthermore, in the first embodiment, assume that N is 8192 and M is 4096 (K=2).

The S/P 103 converts a serial signal into parallel signals. Assuming that a received signal (time-domain signal) is x(n) (n=0 corresponds to the leading portion of the effective symbol), the S/P 103 fetches x(n) from the ISI-free-period holder 102 at a time $n_p \leq n \leq n_p + M - 1$ ($1 \leq p \leq P$), and inputs it to the filter bank 104. This will be referred to as the process of fetching x(n) from the ISI-free-period holder 102 at each sampling time and inputting it to the filter bank 104.

The filter bank 104 includes a plurality of window function units 115 and an inverse fast Fourier transform (IFFT) unit 116. Instead of the IFFT unit 116, a device for performing FFT, discrete Fourier transform (DFT) or inverse DFT (IDFT) may be employed. The number of the window function units 115 corresponds to the number of the filter bank points. The output of each window function unit 115 is supplied to the IFFT 116. Since the IFFT 116 has $2^n$ (n is a natural number) input terminals, the number of the filter bank points is $2^n$ (e.g., $2^{12}$=4096). The first embodiment is characterized in that FFT-based filter banks having M ($M=2^n$) filter bank points are used, and that P filter bank outputs are used for the estimation of the maximum likelihood stream. If the IFFT or FFT is utilized, one method that realizes high-speed computation can generate all replicas. In contrast, if DFT or IDFT is utilized, all replicas cannot be generated by a single method.

The filter bank output corresponding to a received signal at a time $n_p \leq n \leq n_p+M-1$ is given by the following equation, the vector length being M:

$$z_p = IFFT(y_p) \quad (1)$$

$y_p$ in the above equation satisfies the following:

$$y_p = [w_0 \cdot x(n_p), w_1 \cdot x(n_p+1), \ldots, w_{M-1} \cdot x(n_p+M-1)] \quad (2)$$

where $w_m$ is the filter coefficient (window function) of the filter bank 104 ($0 \leq m \leq M-1$). FIG. 3 shows the amplitude characteristic of the frequency response Wi (M=4096; $0 \leq i \leq N-1$) acquired when the Blackman window is used as the window function. The frequency response Wi is the filter characteristic of the filter bank 104.

The modulation signal candidate units 108 generate modulation signal candidates corresponding to the replica generation units 113. Each modulation signal candidate is determined from the modulation scheme. The filter characteristic unit 110 stores the filter characteristic Wi of the filter bank 104 determined by the window function unit 115. The sample time unit 111 determines the above-mentioned $n_p$.

The replica generation units 113 generate replicas of modulation signals of subcarriers corresponding to a received signal, based on the channel response value estimated by the channel estimation unit 109, the modulation signal candidates generated by the corresponding modulation signal candidate units 108, the filter characteristic stored in the filter characteristic unit 110, and $n_p$ determined by the sample time unit 111.

The above will be described in more detail. Assume here that $S_i$ is a modulation signal of the $i^{th}$ subcarrier ($0 \leq i \leq N-1$), and that one of the V modulation signals that satisfy $S_i \in S$ is assigned to $s_i$. In the case of orthogonal frequency division multiplexing (QPSK), S is given by $$S = \left\{ \exp\left(j \cdot \frac{1}{4}\pi\right), \exp\left(j \cdot \frac{3}{4}\pi\right), \exp\left(-j \cdot \frac{1}{4}\pi\right), \exp\left(-j \cdot \frac{3}{4}\pi\right) \right\} \quad (3)$$

where $j^2=-1$. Further, assume that the modulation signal candidate corresponding to $s_i$ is $c_i$ ($s_i \in S$; $0 \leq i \leq N-1$). Furthermore, assume that the value given by the following equation is the estimated channel response value as the frequency response:

$$\hat{H}_i (0 \leq i \leq N-1) \quad (4)$$

In this case, each replica generation unit 113 generates replica $r_p(m)$ ($0 \leq m \leq M-1$) corresponding to the $m^{th}$ one of the filter bank outputs $<z>_p$ and given by the following equation (in the description below, assume that $<A>$ expresses vector A):

$$r_p(m) = \sum_{i=-\alpha}^{+\beta} c_{K \cdot m+i} \hat{H}_{K \cdot m+i} \cdot W_i \cdot \exp\left(-j \frac{2\pi \cdot n_p \cdot i}{N}\right) \quad (5)$$

Each error computation unit 105 computes the likelihood of each modulation signal candidate in the filter bank output corresponding to a received signal at a time $n_p \leq n \leq n_p+M-1$, i.e., the error given by $$E_p^{(\zeta)}(m) = (z_p(m) - r_p(m))^2 \quad (6)$$

Each error addition unit 106 computes the sum of errors included in P filter bank outputs acquired at different times, i.e., $E^{(\zeta)}(m)$ given by $$E^{(\zeta)}(m) = \sum_{p=1}^{P} E_p^{(\zeta)}(m) \quad (7)$$

Each determination unit 107 determines a modulation signal candidate $c_i$ of the maximum likelihood (minimum error) that satisfies the following expression:

$$\min_c \{E^{(\zeta)}(m)\} \quad (8)$$

Figure 4:
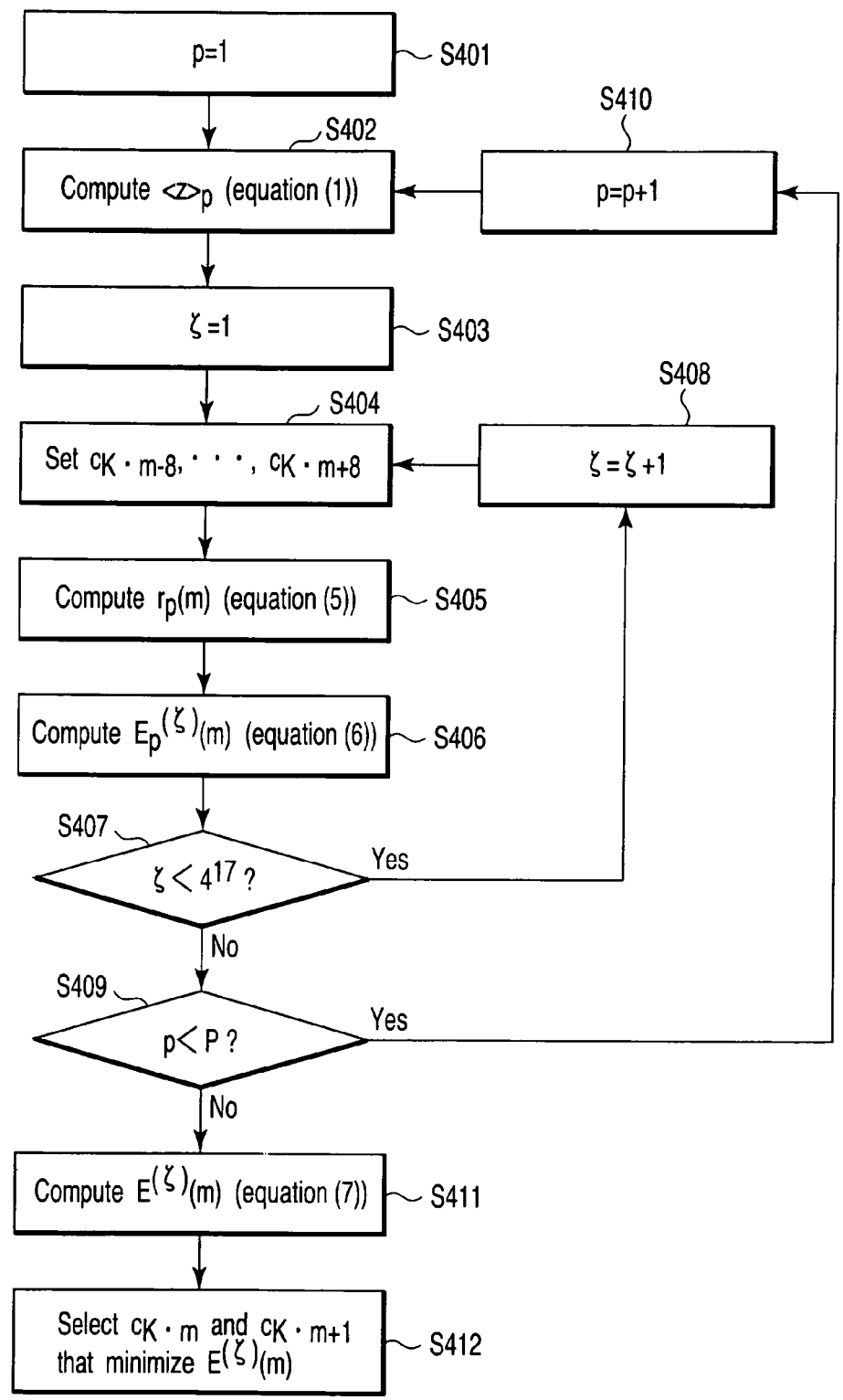
FIG. 4 is a flowchart illustrating the operation of the OFDM demodulation apparatus of FIG. 1.

Referring now to FIG. 4, the operation of the OFDM demodulation apparatus of the first embodiment will be described. Specifically, a description will be given of the process performed on the $m^{th}$ filter bank output.

Firstly, p is set to 1 (step S401), and the filter bank 104 computes $<z>_p$ using the above-mentioned equation (1) (step S402). Until p exceeds the number P of the filter bank outputs used for the estimation of the maximum likelihood stream, the following steps S402 to S407 are iterated. Subsequently, $\zeta$ is set to 1 (step S403), and the following steps S404 to S406 are iterated until $\zeta$ exceeds $4^{17}$ ("4" corresponds to P, and "17" corresponds to the number of subcarriers used by the filter bank 104 for computation).

After that, the $m^{th}$ replica generation unit 113 generates a replica based on the channel response value estimated by the channel estimation unit 109, the modulation signal candidate generated by the corresponding $m^{th}$ modulation signal candidate unit 108, the filter characteristic stored in the filter characteristic unit 110, and $n_p$ determined by the sample time unit 111 (step S405). Thereafter, the $m^{th}$ error computation unit 105 computes the likelihood (error rate) of the modulation signal candidate (step S406).

After that, the $m^{th}$ error addition unit 106 computes the sum of errors in P filter bank outputs acquired at different times (step S411). The $m^{th}$ determination unit 107 selects K modulation signal candidates that provide the minimum error (step S412). In this case, K=2 as aforementioned.

The same process as the above is performed on any other filter bank output. Further, the modulation signal used in the flowchart is a QPSK-modulated signal. The number of subcarriers considered for computation based on the equation (5) is set to 17 in total (i.e., K×m−8 to K×m+8). The determination unit 107 corresponding to the $m^{th}$ filter bank output determines modulation signals of the $(K \times m)^{th}$ and $(K \times m+1)^{th}$ subcarriers.

As described above, the first embodiment of the invention is directed to an OFDM demodulation apparatus for reducing, using an ISI free period, interference due to a delayed wave longer than a guard interval. The embodiment is characterized in that the number of subcarriers (number of states) to be considered for replica generation and hence the number of computations can be reduced by the estimation of the maximum likelihood stream using a filter bank. For instance, assuming that the number of subcarriers to be considered in units of filter bank outputs is L, the order of computations is $O(V^L \times M)$.

Furthermore, an FFT-based filter bank can be used by setting the number of filter bank points to $2^n$ (n is a natural number), thereby reducing the number of computations. In addition, the S/N can be enhanced if P filter bank outputs are used for the estimation of the maximum likelihood stream.

Second Embodiment

Referring to FIG. 5, an OFDM demodulation apparatus according to a second embodiment of the invention will be described. The second embodiment differs from the first embodiment in that the former additionally employs error comparison units 507 and 508 and determination units 509 and 510. Although an error computation unit 501, error addition unit 503, determination unit 505 or modulation signal candidate unit 511 is not shown in FIG. 1, they are also incorporated in the OFDM demodulation apparatus of the first embodiment. Further, in the second embodiment, the number of the error computation units, the error addition units or determination units is not limited to three (error computation units 105, 501, 502; error addition units 106, 503, 504; determination units 107, 505, 506), but M error computation units, M error addition units and M determination units are employed. The OFDM demodulation apparatus of the second embodiment also employs (M−1) error comparison units (including comparison units 507 and 508) and (M−1) other determination units (including determination units 509 and 510).

The error comparison unit 507 selects the smaller one of the sum of errors output from the error addition unit 106 and the sum of errors output from the error addition unit 503. The same can be said of the error comparison unit 508.

The determination unit 509 selects a modulation signal candidate of the minimum error based on the sum selected by the error comparison unit 507. In the second embodiment, modulation signals of subcarriers corresponding to frequency-adjacent FFT filter bank outputs are compared by comparing, for example, the outputs of the error addition units 106 and 503 using the error comparison unit 507. As a result, an error addition signal indicating a modulation signal candidate of a smaller error is input to the determination unit 509.

Figure 6:
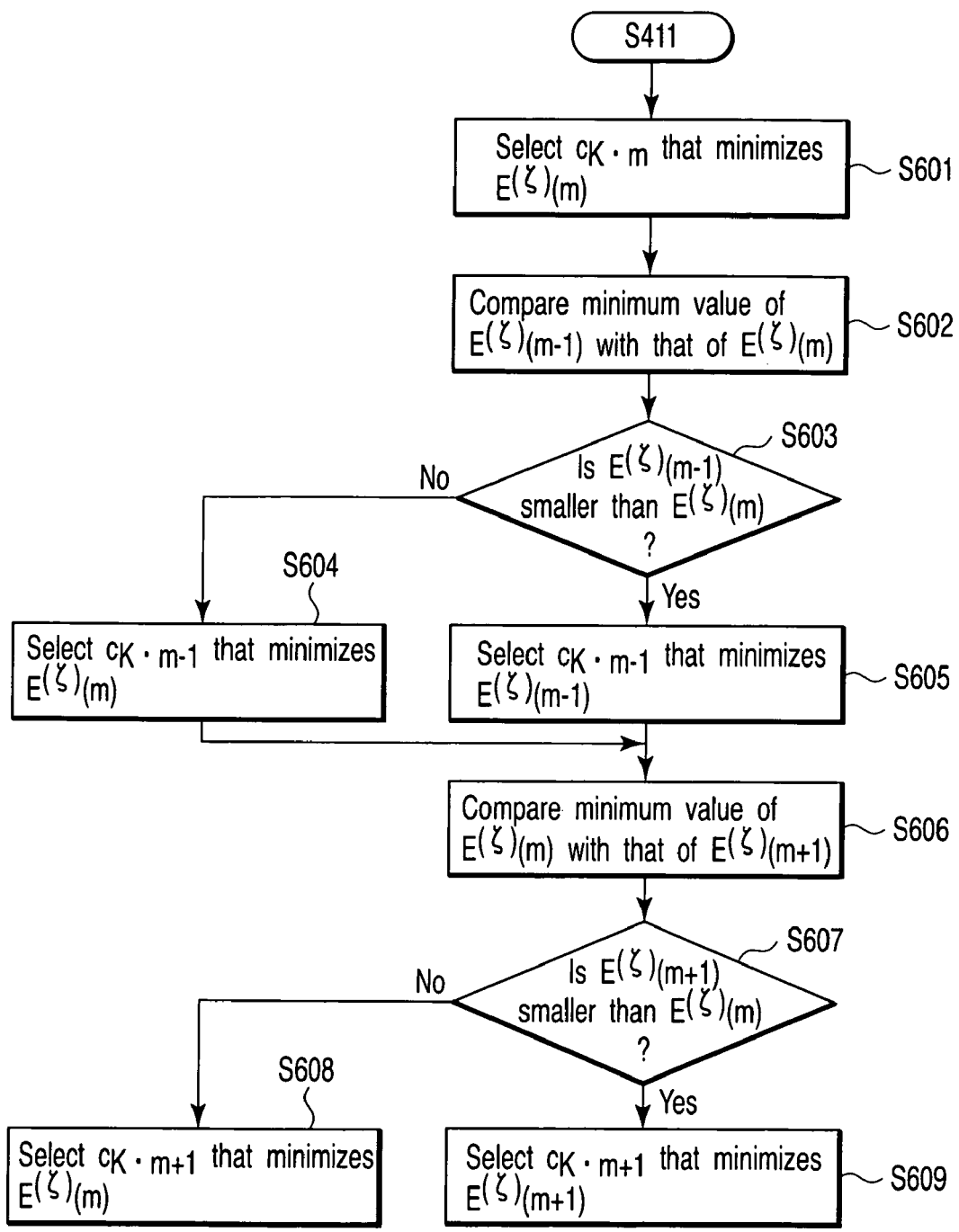
FIG. 6 is a flowchart illustrating the operation of the OFDM demodulation apparatus of FIG. 5.

Referring to FIG. 6, the operation of the OFDM demodulation apparatus of the second embodiment will be described. Specifically, a description will be given of the process performed on the $m^{th}$ filter bank output. FIG. 6 is a flowchart illustrating the process. The operation performed before the computation of the value expressed by the equation (7) is identical to that shown in FIG. 4.

After steps S401 to S411 in FIG. 4 are executed, step S601 in FIG. 6 is executed. At step S601, the determination unit 505 corresponding to the output of the filter bank 104 that includes a largest number of signal components $c_{Km}$ selects $c_{Km}$ that makes $E^{(c)}(m)$ minimum. Subsequently, the error comparison unit 507 compares the minimum value of the sum $(E^{(c)}(m))$ of errors output from the error addition unit 106 with that of the sum $(E^{(c)}(m-1))$ of errors output from the error addition unit 503 (step S602). If the error comparison unit 507 determines at step S603 that $E^{(c)}(m-1)$ is smaller than $E^{(c)}(m)$, the program proceeds to step S605, whereas if the error comparison unit 507 determines at step S603 that $E^{(c)}(m-1)$ is not smaller than $E^{(c)}(m)$, the program proceeds to step S604.

At step S604, the determination unit 509 selects $c_{Km-1}$ that makes $E^{(c)}(m)$ minimum, followed by the program proceeding to step S606. At step S605, the determination unit 509 selects $c_{Km-1}$ that makes $E^{(c)}(m-1)$ minimum, followed by the program proceeding to step S606. Namely, concerning $c_{Km-1}$ the same number of signal components are contained in the determination units 107 and 505, therefore the determination result of the smaller error is used.

Similarly, the error comparison unit 508 compares the minimum value of the sum $(E^{(c)}(m))$ of errors output from the error addition unit 503 with that of the sum $(E^{(c)}(m+1))$ of errors output from the error addition unit 504 (step S606). If the error comparison unit 508 determines at step S607 that $E^{(c)}(m+1)$ is smaller than $E^{(c)}(m)$, the program proceeds to step S609, whereas if the error comparison unit 508 determines at step S607 that $E^{(c)}(m+1)$ is not smaller than $E^{(c)}(m)$, the program proceeds to step S608.

At step S608, the determination unit 510 selects $c_{Km+1}$ that makes $E^{(c)}(m)$ minimum. At step S609, the determination unit 510 selects $c_{Km+1}$ that makes $E^{(c)}(m+1)$ minimum. Namely, concerning $c_{Km+1}$, the same number of signal components are contained in the determination units 505 and 506, therefore the determination result of the smaller error is used.

As described above, in the second embodiment, the performance of determination concerning modulation signals of subcarriers corresponding to frequency-adjacent FFT filter bank outputs can be improved.

Third Embodiment

Figure 7:
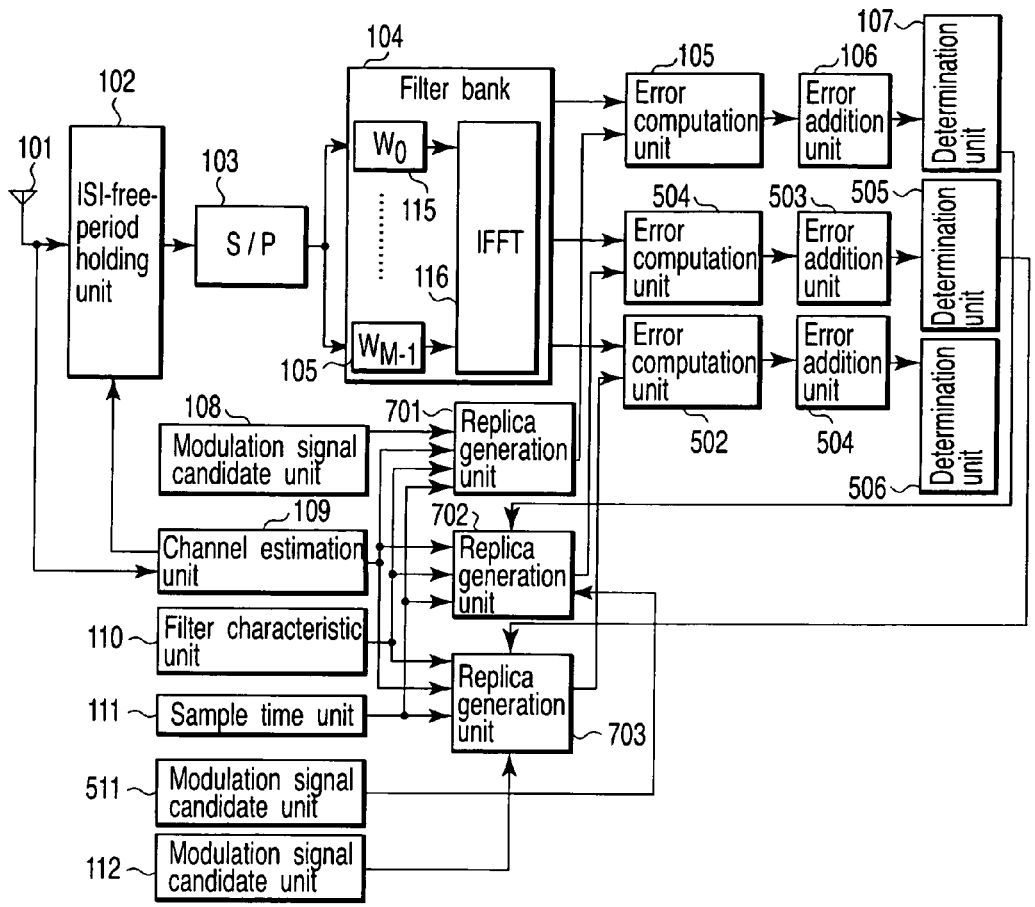
FIG. 7 is a block diagram illustrating an OFDM demodulation apparatus according to a third embodiment of the invention.

Referring to FIG. 7, an OFDM demodulation apparatus according to a third embodiment of the invention will be described. The third embodiment differs from the first embodiment in that in the former, the outputs of the determination units 107 and 505 are input to replica generation units 702 and 703, respectively. Although an error computation unit 501, error addition unit 503, determination unit 505 or modulation signal candidate unit 511 is not shown in FIG. 1, they are also incorporated in the OFDM demodulation apparatus of the first embodiment. Further, in the third embodiment, the number of the error computation units, the error addition units or determination units is not limited to three (error computation units 105, 501, 502; error addition units 106, 503, 504; determination units 107, 505, 506), but M error computation units, M error addition units and M determination units are employed.

The replica generation unit 702 that corresponds to the $m^{th}$ one of the M outputs of the FFT filter bank 104 uses, as a definite value, the output of the determination unit 107 corresponding to the $(m-1)^{th}$ one of the M outputs of the filter bank 104, i.e., the determination value of the modulation signal.

Figure 8:
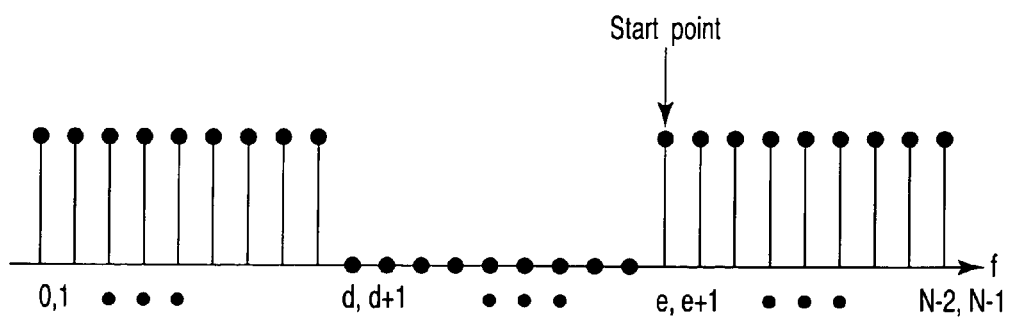
FIG. 8 is a view useful in explaining a subcarrier input to the error computation unit shown in FIG. 7.

Further, in the third embodiment, the above process is started, beginning with the one of the M outputs of the filter bank 104 that includes the boundary (corresponding to the $e^{th}$ output in FIG. 8) of a null subcarrier and modulation subcarrier. This prevents a greater part of the subcarriers input to the error computation unit 105 from being formed of null subcarriers. As a result, the initial determination performance (i.e., the determination performance of the determination unit 107) is improved, which also improves the replica generated by the replica generation unit 702 that utilizes the determination result of the determination unit 107. Namely, the entire determination performance is improved.

The boundary is beforehand determined between the transmitter side and receiver side of the communication system, and it is easy to input, to the error computation unit 105, a filter bank output that includes the boundary of a null subcarrier and modulation subcarrier.

Figure 9:
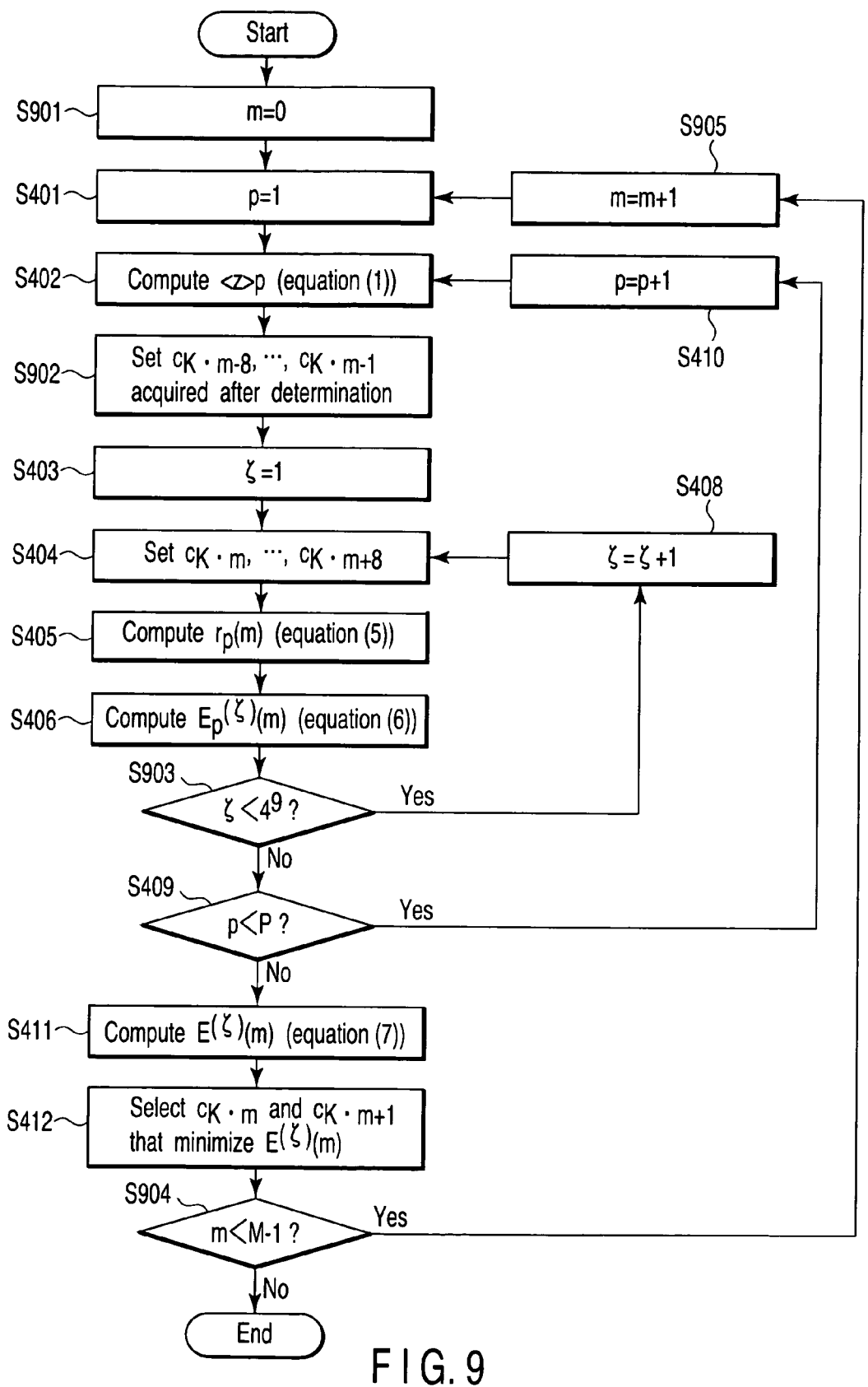
FIG. 9 is a flowchart illustrating the operation of the OFDM demodulation apparatus of FIG. 7.

Referring now to FIG. 9, the operation of the OFDM demodulation apparatus of the third embodiment will be described. In the flowchart of FIG. 9, step S412 is executed when m is set to each of the values 0 to M−1 (steps S901, S905, S904).

At step S902, eight subcarriers in total, ranging from Km−8 to Km−1, acquired after determination are used as definite values, and nine subcarriers Km to Km+8 are used as parameters. For instance, the replica generation unit 702 uses, as definite value, eight subcarriers Km−8 to Km−1 acquired after determination by the determination unit 107.

At step S404, $c_{Km}, \ldots, c_{Km+8}$ are set, which correspond to the nine subcarriers Km to Km+8, acquired by subtracting the subcarriers Km−8 to Km−1 acquired after determination from all subcarriers Km−8 to Km+8, i.e., 17 subcarriers in total, used for the computation based on the equation (5). Accordingly, at step S903, steps S404 to S406 are iterated until $\zeta$ exceeds $4^9$ (9 is used instead of 17 at step S407 in FIG. 4).

Figure 10:
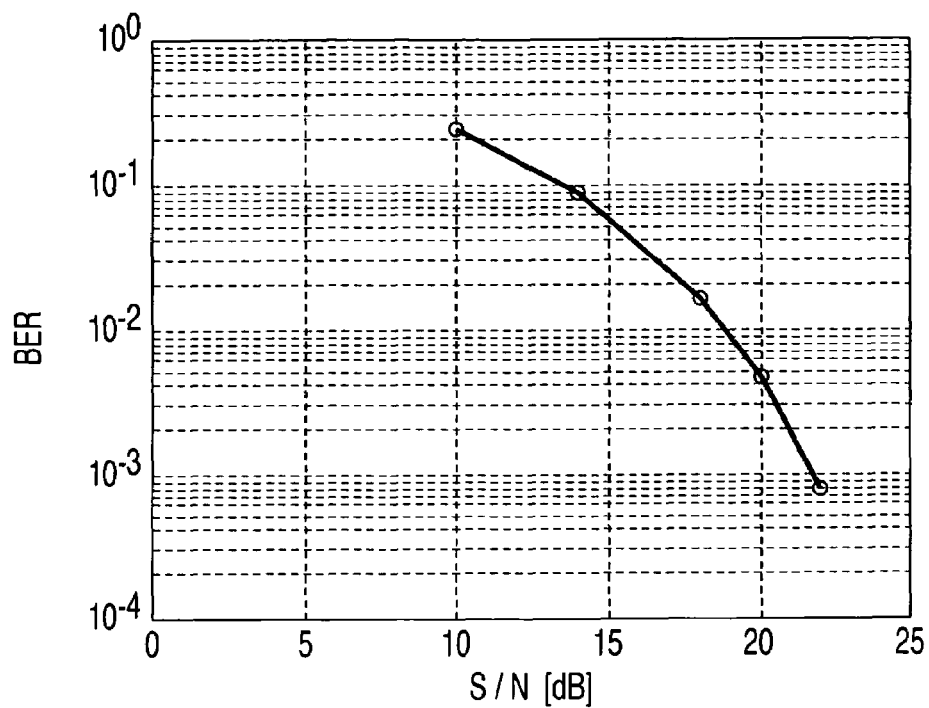
FIG. 10 is the S/N-BER characteristic of the OFDM demodulation apparatus of FIG. 7.

FIG. 10 shows the S/N versus BER (bit error rate) characteristic of the OFDM demodulation apparatus of the third embodiment. The characteristic shown in FIG. 10 is acquired when N, M, D and P are set to 8192, 4098, 6000 and 5, respectively. As can be understood from FIG. 10, the bit error rate abruptly decreases as the S/N increases. In the prior art, the bit error rate more gently decreases as the S/N increase, although this is not shown. Namely, in the third embodiment, the bit error rate with respect to the S/N is smaller than in the prior art.

Modification Of The Third Embodiment

Figure 11:
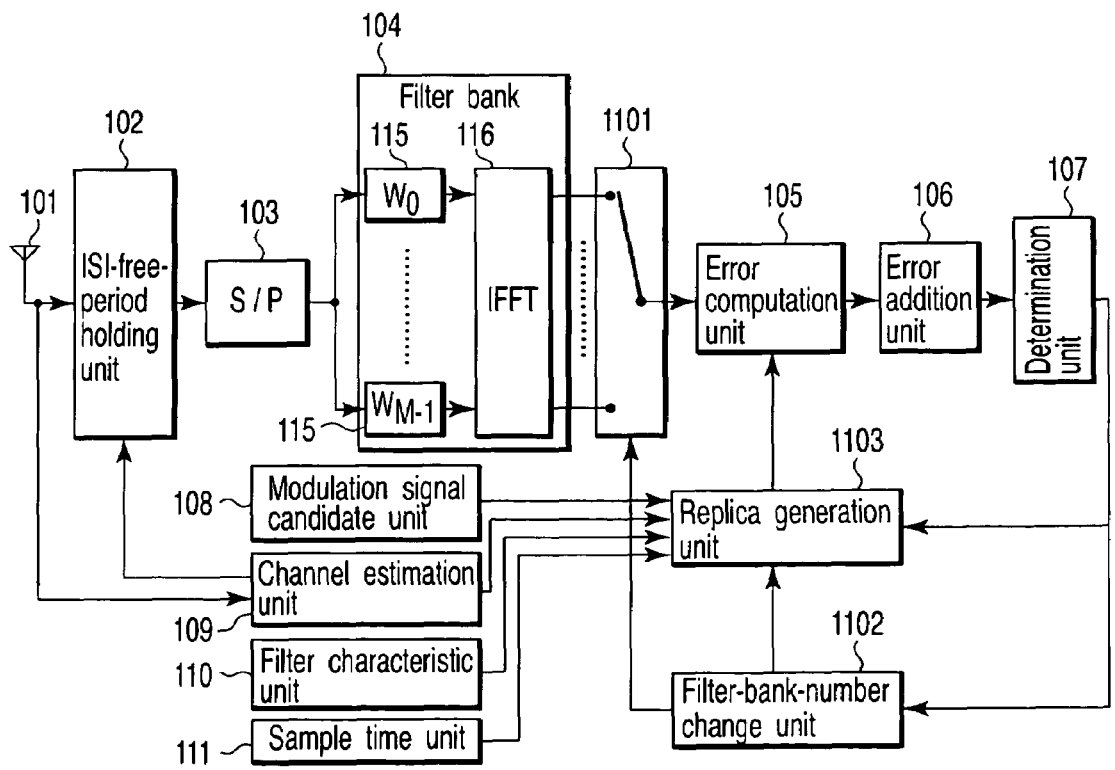
FIG. 11 is a block diagram illustrating an OFDM demodulation apparatus according to a modification of the third embodiment.

Referring to FIG. 11, an OFDM demodulation apparatus according to a modification of the third embodiment will be described.

This modification differs from the third embodiment shown in FIG. 7 in that the former employs only a single error computation unit, error addition unit, determination unit, replica generation unit and modulation signal candidate unit, and that the former further comprises a switching unit 1101 and filter-bank-number change unit 1102.

However, the modification is similar to the third embodiment of FIG. 7 in operation and advantage.

The filter-bank-number change unit 1102 designates one of filter bank output numbers 0 to M−1. In general, the filter-bank-number change unit 1102 sequentially designates the numbers from 0 to M−1.

The switching unit 1101 switches the connection between the filter bank 104 and the error computation unit 105 to output, to the error computation unit 105, the output signal of the filter bank 104 that corresponds to the number designated by the filter-bank-number change unit 1102.

A replica generation unit 1103 receives the modulation signal candidate determined from the subcarrier determined by the determination unit 107, thereby generating a replica for each subcarrier that is not yet determined. Specifically, when generating a replica corresponding to the $m^{th}$ filter bank output, the replica generation unit 1103 uses, as a definite value, the output of the determination unit 107 that corresponds to the $(m-1)^{th}$ filter bank output., i.e., a modulation signal determination value.

As described above, in the third embodiment of the invention, concerning the overlapping portion of the $m^{th}$ and $(m-1)^{th}$ modulation signals contained in the frequency-adjacent FFT filter bank outputs, the determination value corresponding to the $(m-1)^{th}$ filter bank output is used for the $m^{th}$ replica generation unit, therefore the number of subcarriers (the number of states) to be considered for the generation of the $m^{th}$ replica is reduced. Accordingly, the number of computations is reduced.

Fourth Embodiment

Figure 12:
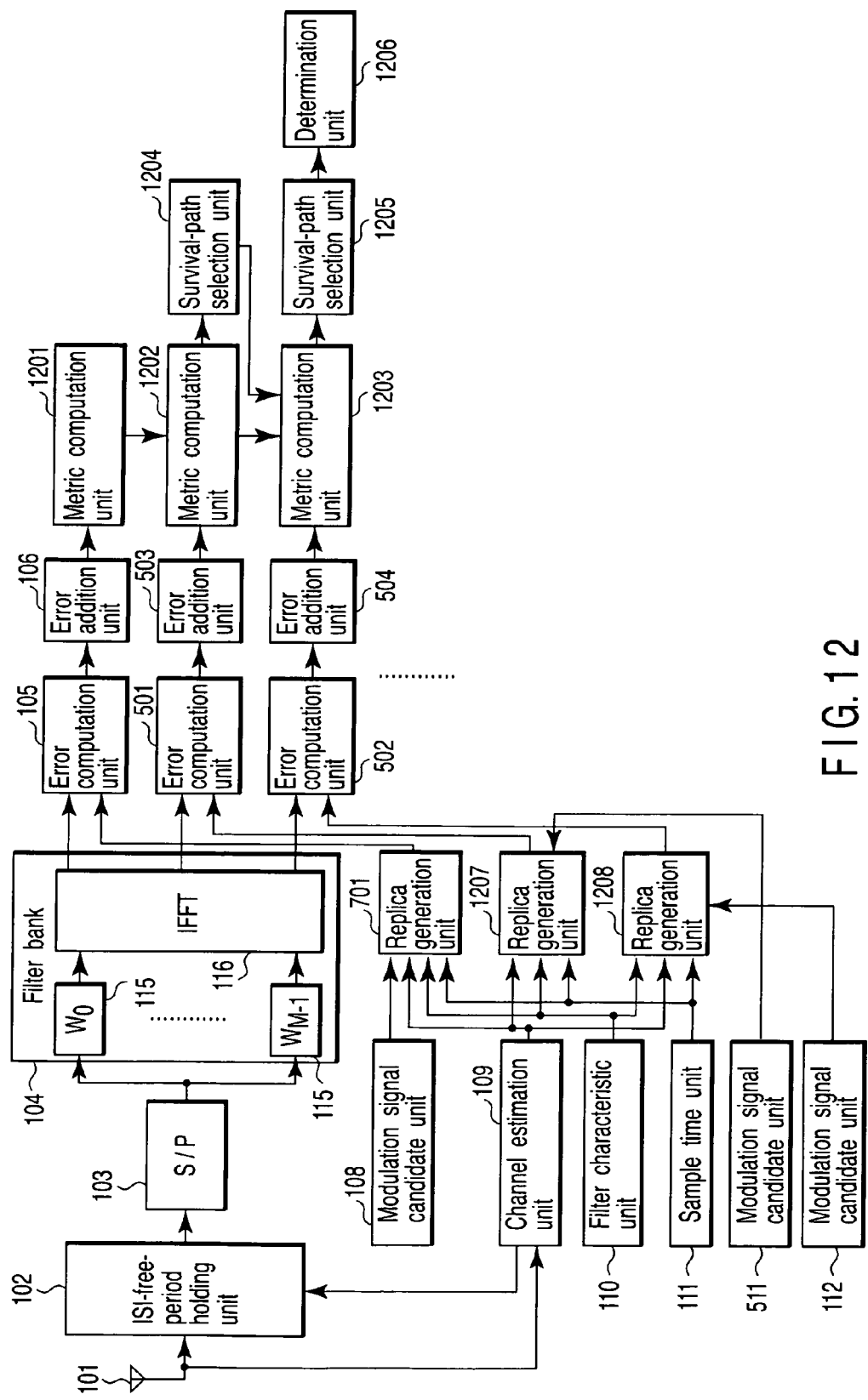
FIG. 12 is a block diagram illustrating an OFDM demodulation apparatus according to a fourth embodiment of the invention.

Referring to FIG. 12, an OFDM demodulation apparatus according to a fourth embodiment will be described. The fourth embodiment differs from the first embodiment in that in the former, the determination unit 107 includes metric computation units 1201, 1202 and 1203, survival-path selection units 1204 and 1205 and a single determination unit 1206. The number of the error computation units, error addition units or metric computation units is not limited to three (error computation units 105, 501, 502; error addition units 106, 503, 504; metric computation units 1201, 1202, 1203), but M error computation units, M error addition units and M metric computation units are employed. Further, the OFDM demodulation apparatus of the fourth embodiment employs (M−1) survival-path selection units including the survival-path selection units 1204 and 1205.

The error computation units 105, 501 and 502 receive replicas from replica generation units 701, 1207 and 1208, respectively.

The metric computation units 1201, 1202 and 1203 compute the metric values of the respective filter bank outputs. The metric means likelihood in the Viterbi algorithm. Metric values are related to errors. The greater the metric value, the smaller the error.

Based on the metric values output from the metric computation unit 1202 (1203), the survival-path selection unit 1204 (1205) selects a single combination of candidates $c_{2m}$ and $c_{2m+1}$ providing the maximum metric value, from a plurality of combinations of candidates $c_{2m}$ and $c_{2m+1}$ corresponding to subcarriers, the number of the subcarriers being determined from the modulation scheme, each candidate combination having the same value.

Figure 13:
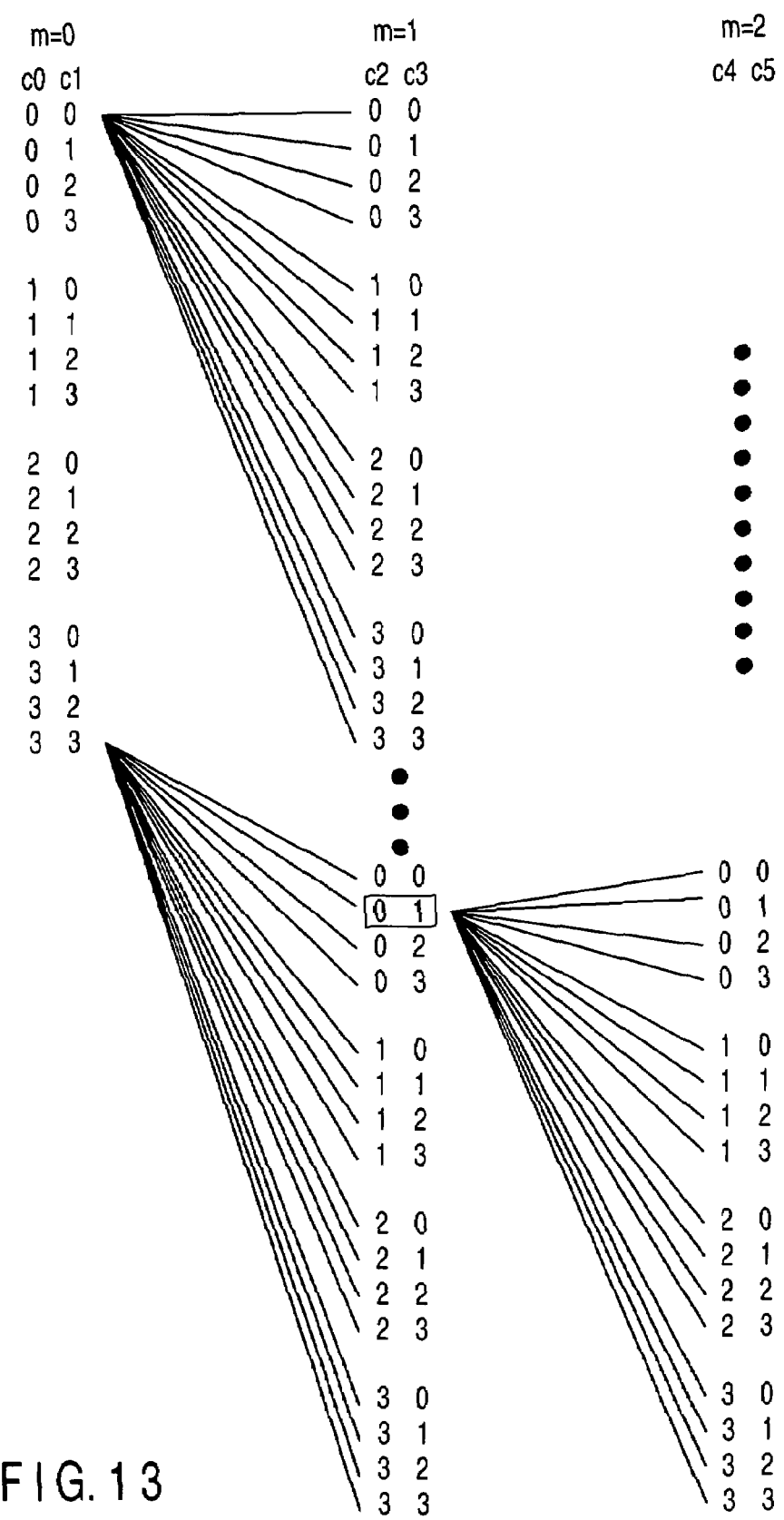
FIG. 13 is a view illustrating a trellis transition example that occurs in the OFDM demodulation apparatus of FIG. 12.

The determination unit 1206 receives, from the survival-path selection unit 1205, the result of maximum-likelihood stream estimation using the Viterbi algorithm, and selects $c_o, \ldots, c_{N-1}$ corresponding to one of all received paths that has the maximum metric value. Namely, the output of the survival-path selection unit corresponding to m=M−1 contains all candidates $c_{2m}$ and $c_{2m+1}$ selected by the survival-path selection units corresponding to m=1 to m=M−1. In the fourth embodiment, part or all of the lines shown in FIG. 13 are referred to as symbolic paths. As shown in FIG. 13, part of the lines connect (relate) candidate combinations of $C_{2m}$ and $C_{2m+1}$ selected by the survival-path selection units corresponding to m=1 to m=M−1. The other part of the lines connect candidate combinations of $C_2$ and $C_3$, selected by the survival-path selection unit corresponding to m=1, to candidate combinations of candidate combinations of $C_0$ and $C_1$ selected by the survival-path selection unit corresponding to m=0.

Specifically, the metric value corresponding to the $m^{th}$ filter bank output and computed by the metric computation unit 1203 is computed based on the metric value computed by the metric computation unit 1202 and corresponding to the $(m-1)^{th}$ filter bank output, and based on the subcarriers existing in the paths selected by the survival-path selection unit 1204. Further, the survival path selected by the survival-path selection unit 1204 and corresponding to the $m^{th}$ filter bank output is selected based on the metric value computed by the metric computation unit 1202 and corresponding to the $(m-1)^{th}$ filter bank output.

Referring to FIGS. 13 and 14, the procedure of control by the OFDM demodulation apparatus of the fourth embodiment will be described. FIG. 13 shows an example in which survival paths are selected. FIG. 13 shows a trellis transition example unique to the Viterbi algorithm. Assume here that QPSK is selected as the modulation scheme, and K subcarriers with carrier numbers 2m and 2m+1 (in this case, K=2) are contained in the $m^{th}$ filter bank output. In the flowchart of FIG. 14, processing is performed when m is set to each of the values 0 to M−1 (steps S901, S905, S904), thereby performing step S1403.

At a stage corresponding to each value of m (m≧1), the metric computation units 1201, 1202 and 1203 compute, for each survival path, sixteen metric values corresponding to a plurality of combinations of $c_{2m}$ and $c_{2m+1}$ (step S1401).

At a stage corresponding to each value of m, the survival-path selection units 1204 and 1205 select a single combination of $c_{2m}$ and $c_{2m+1}$ providing the maximum metric value, from a plurality of combinations of candidates $c_{2m}$ and $c_{2m+1}$ corresponding to subcarriers, each combination having the same value, and set the combination as terminal values in the stage (step S1402). Specifically, in the example of FIG. 13, if m=1 and $(c_2, c_3)=(0, 1)$, the combination of values corresponding to $(c_0, c_1)=(3, 3)$ and $(c_2, C_3)=(0, 1)$, i.e., the enclosed values in FIG. 13, are selected. Accordingly, in the case of FIG. 13, the survival-path selection unit 1205 finally selects sixteen paths of higher likelihood values as survival paths.

Subsequently, the determination unit 1206 selects a path of the maximum likelihood value from the sixteen survival paths selected in the process of the $(M-1)^{th}$ filter bank output, thereby fixing the path (step S1403). Namely, the determination unit 1206 receives the results of likelihood stream estimation from the survival-path selection unit 1205, and selects $c_0, \ldots c_{N-1}$ corresponding to paths of the maximum likelihood values included in all the received paths (step S1403).

As described above, in the fourth embodiment, the Viterbi algorithm is utilized for maximum-likelihood stream estimation using the FFT filter bank, thereby reducing the number of subcarriers (the number of states) to be considered for metric computation. As a result, the number of computations can be reduced.

Fifth Embodiment

Referring to FIG. 15, an OFDM demodulation apparatus according to a fifth embodiment will be described. The fifth embodiment differs from the first embodiment in that in the former, a symbol timing synchronization unit 1501 and channel estimation unit 1502 are added, and the channel estimation unit 109 is eliminated. The channel estimation unit 1502 includes a pilot-filter-bank-output extraction unit 1503 and MMSE estimation unit 1504.

The symbol timing synchronization unit 1501 performs synchronization of symbol timing. Namely, the symbol timing synchronization unit 1501 detects the leading portion of each effective symbol. More specifically, the symbol timing synchronization unit 1501 detects the time when the leading portion of each effective symbol reaches. In the initial channel estimation stage in which the ISI free periods are unclear, the symbol timing synchronization unit 1501 can determine a tentative ISI free period from the leading portion and length of each effective symbol. Namely, the symbol timing synchronization unit 1501 can detect a tentative ISI free period.

The channel estimation unit 1502 estimates the time characteristic of each channel response. The pilot-filter-bank-output extraction unit 1503 extracts, from the outputs of the FFT filter bank 104, filter bank outputs that contain pilot subcarrier components. The MMSE estimation unit 1504 estimates the time characteristic of each channel response based on a least square error criterion, using the pilot filter bank outputs.

The channel estimation unit 1502 firstly performs channel estimation based on the tentative ISI free period. Namely, the channel estimation unit 1502 estimates how degree each delayed wave is behind the leading wave in an OFDM signal. Specifically, since the channel estimation unit 1502 can detect the delay time of a delayed wave from the time characteristic of the channel response in the first channel estimation process, it computes an ISI free period as a definite value in accordance with the maximum delay time of the delayed wave. After that, the channel estimation unit 1502 outputs the definite ISI free period held in the ISI-free-period holder 102.

Subsequently, the channel estimation unit 1502 again performs channel estimation using the definite ISI free period. Thus, the channel estimation accuracy is improved.

A description will be given, as a specific example, of MMSE estimation in a channel that contains two waves, i.e., preceding and delayed waves. The MMSE estimation unit 1504 estimates the time characteristic that minimizes the difference between the $m^{th}$ pilot filter bank output $z_p(m)$ and the $2m^{th}$ known pilot subcarrier pilot (2m). The channel estimation value <h> acquired by MMSE is given by $$h = (R^{-1} \cdot r)^* \quad (9)$$

where R is a correlation matrix, and <r> is a correlation vector. These are given by $$R = E[h_r \cdot h_r^*] \quad (10)$$

$$r = E[h_r \cdot z_p(m)] \quad (11)$$

where $<h>_r = [h_0, h_1]^T$ is a (2×1) vector having, as components, pilot subcarriers corresponding to the preceding and delayed waves, and is given by $$h_0 = \left[ W_0 \cdot \exp\left(-j \cdot \frac{2\pi}{N} \cdot n_p \cdot (2m-1)\right)\right]^* \cdot \text{pilot}(2m) \quad (12)$$

$$h_1 = \left[ W_0 \cdot \exp\left(-j \cdot \frac{2\pi}{N} \cdot (n_p - D) \cdot (2m-1)\right)\right]^* \cdot \text{pilot}(2m) \quad (13)$$

where E[ ] represents an expected-value computation in which actually, a plurality of pilot subcarriers are averaged.

Figure 18A:
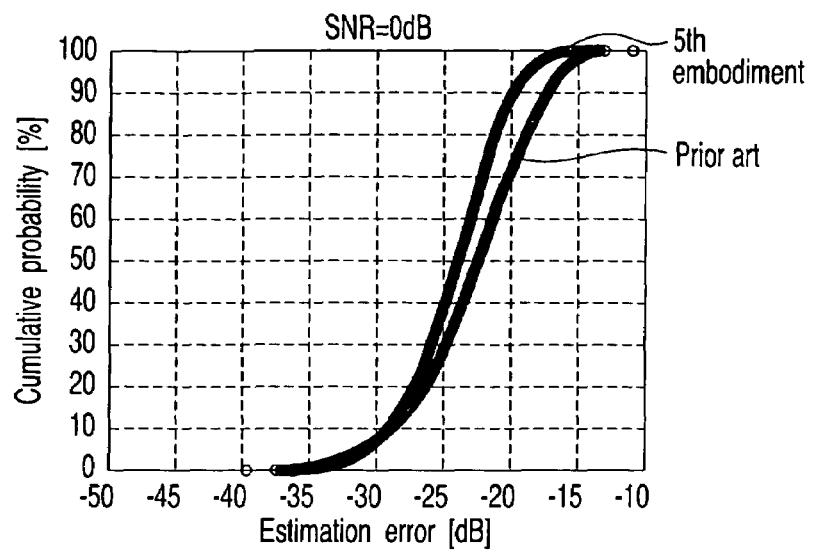
FIGS. 18A, 18B and 18C are graphs illustrating the channel estimation accuracy levels of the OFDM demodulation apparatus of FIG. 15.
Figure 18B:
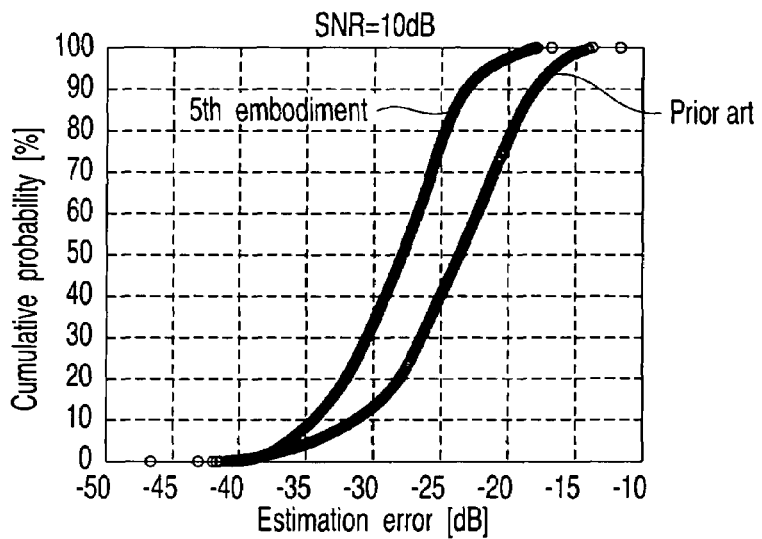
Figure 18C:
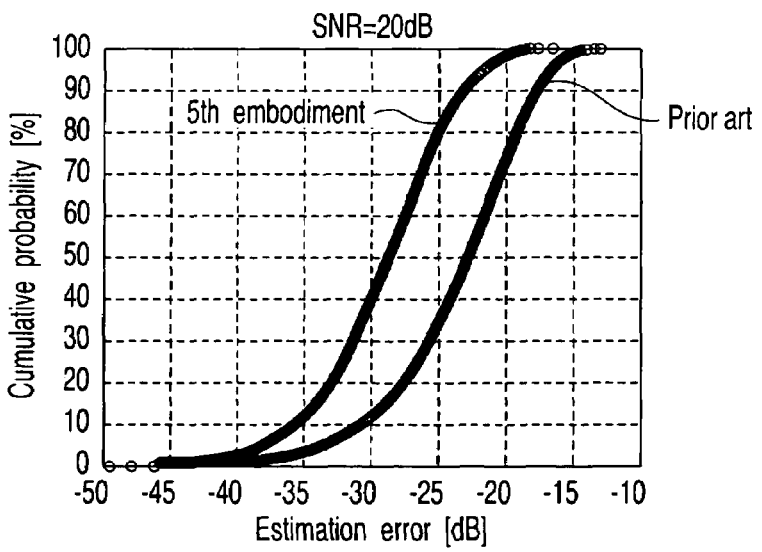

Referring then to FIGS. 18A, 18B and 18C, channel estimation accuracy will be described. FIGS. 18A, 18B and 18C show the relationship between the cumulative probability and the channel estimation error acquired when N, M, D and P are set to 8192, 4098, 6000 and 5, respectively, and the delay time of the delayed wave is set to 2000. As is evident from these figures, the higher the SNR, the larger the improved width, compared to the prior art.

As described above, in OFDM channel estimation performed when a delayed wave longer than a guard interval exists, if the prior art scheme that utilizes all effective symbol period is employed, both inter-symbol interference and inter-subcarrier interference occur, which degrades the accuracy of channel estimation. In contrast, in the channel estimation scheme of the fifth embodiment, no inter-symbol interference occurs. Although the level of inter-subcarrier interference is increased, the degree of increase is suppressed by the filter bank. Thus, the OFDM demodulation apparatus of the fifth embodiment suppresses such interference and hence improves the channel estimation accuracy.

Sixth Embodiment

Referring to FIG. 16, an OFDM demodulation apparatus according to a sixth embodiment will be described. The sixth embodiment differs from the fifth embodiment in that in the former, a channel estimation unit 1601 for receiving the outputs of the determination units 107 is added. The channel estimation unit 1601 includes a pilot-filter-bank-output extraction unit 1602 and MMSE estimation unit 1603.

The pilot-filter-bank-output extraction unit 1602 extracts, from the outputs of the FFT filter bank 104, filter bank outputs that contain pilot subcarrier components. The MMSE estimation unit 1603 estimates the time characteristic of each channel response based on a least square error criterion, using the modulation signals output from the determination units 107 and the pilot filter bank outputs. Namely, in the fifth embodiment, only the pilot subcarriers corresponding to the preceding wave and delayed wave are contained as the components of $<h>_r$. In contrast, in the sixth embodiment, the data subcarriers corresponding to the preceding wave and delayed wave can be contained as the components of $<h>_r$, as well as the above-mentioned subcarriers, since the determination results output from the determination units 107 can also be used as known signals for the data subcarriers contained in the pilot filter bank outputs.

As described above, in the sixth embodiment of the invention, determinations are performed using channel estimation values, and the determination results are used as known signals to again perform channel estimation. As a result, the accuracy of channel estimation is improved.

Seventh Embodiment

Figure 17:
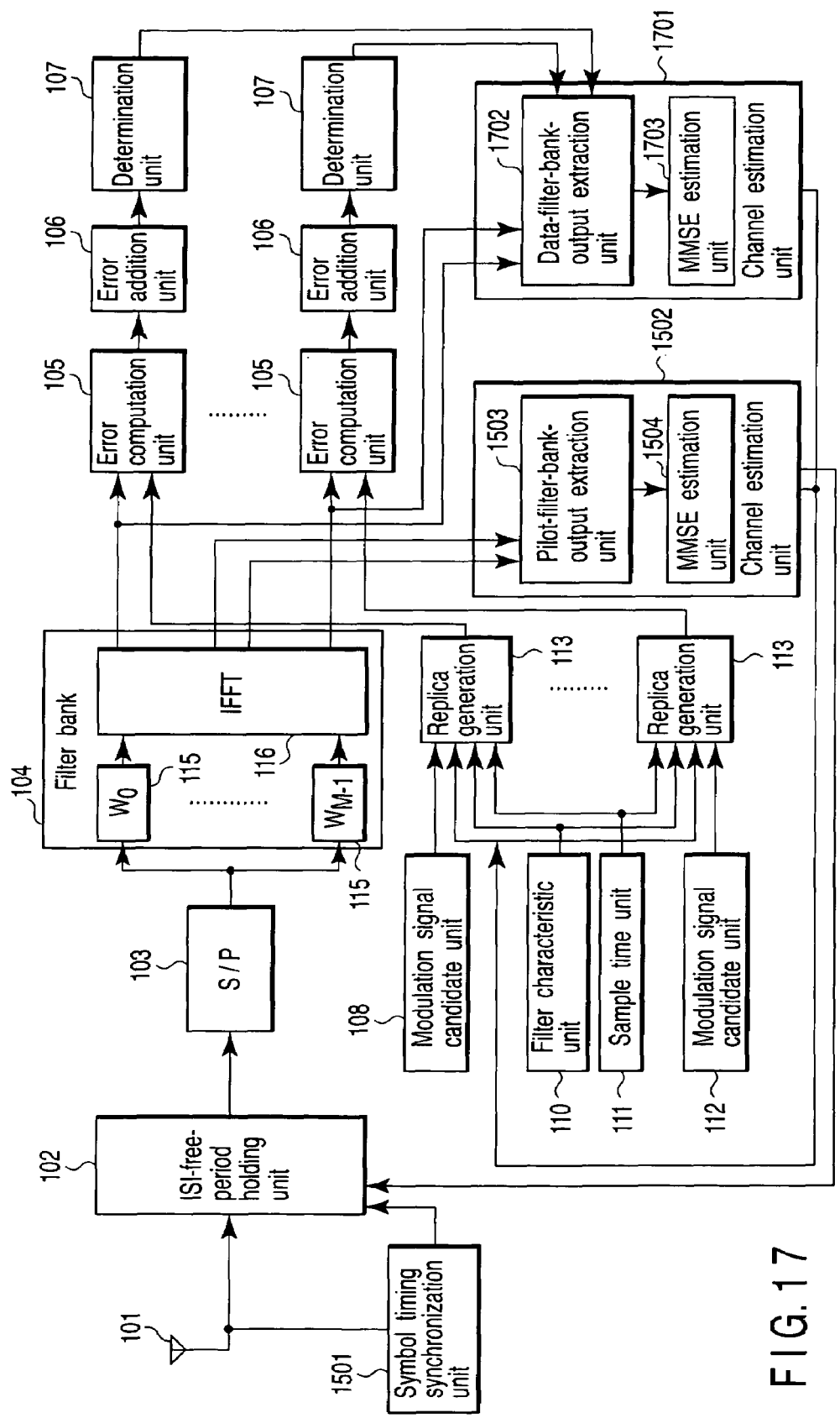
FIG. 17 is a block diagram illustrating an OFDM demodulation apparatus according to a seventh embodiment of the invention.

Referring to FIG. 17, an OFDM demodulation apparatus according to a seventh embodiment will be described. The seventh embodiment differs from the fifth embodiment in that in the former, a channel estimation unit 1701 for receiving the outputs of the determination units 107 is added. The channel estimation unit 1701 includes a data-filter-bank-output extraction unit 1702 and MMSE estimation unit 1703.

The data-filter-bank-output extraction unit 1702 extracts, from the outputs of the FFT filter bank 104, filter bank outputs that contain pilot subcarrier components. More specifically, the data-filter-bank-output extraction unit 1702 extracts, for example, filter bank outputs corresponding to data subcarriers existing between two pilot subcarriers. The MMSE estimation unit 1703 estimates the time characteristic of each channel response based on a least square error criterion, using the modulation signals output from the determination units 107 and the data filter bank outputs. Namely, in the fifth embodiment, the pilot subcarriers corresponding to the preceding wave and delayed wave are contained as the components of $<h>_r$. In contrast, in the seventh embodiment, the data subcarriers corresponding to the preceding wave and delayed wave can be contained as the components of $<h>_r$, since the determination results output from the determination units 107 can also be used as known signals for the data subcarriers.

Further, in the channel estimation by MMSE using determination values corresponding to data subcarriers, the frequency response of each channel response may be estimated. When the level of channel distortion due to frequency selective fading is high, estimation of frequency response can improve the accuracy of estimation, compared to estimation of time characteristic.

As described above, in the seventh embodiment of the invention, determinations are performed using channel estimation values, and the determination results are used as known signals to again perform channel estimation. As a result, the accuracy of channel estimation is improved. When the SNR of each pilot subcarrier is low, the accuracy of channel estimation can be improved if data filter bank outputs are used.

In the above-described seventh embodiment, the number of computations is reduced using an ISI free period. As a result, the number of computations performed for reducing the interference by a delayed wave longer than a guard interval can be reduced without degrading the accuracy of channel estimation.

Eighth Embodiment

The following table shows the correspondence between the symbols used in eighth and ninth embodiments and in the first to seventh embodiments.

TABLE 1

| Eighth and ninth embodiments | First to seventh embodiments |
|---|---|
| $L_{FFT}$ | N |
| p | i |
| X(p) | $s_i$ |
| y(n) | x(n) |
| $L_{FB}$ | M |
| K | P |
| k | p |
| $\tau_k$ | $n_p$ |
| $z_k(n)$ | $y_p$ |
| $w_n$ | $w_m$ |
| $Z_k(m)$ | $z_p(m)$ |
| W(p) | $W_i$ |
| $\hat{Z}_k(m)$ | $r_p(m)$ |
| $\hat{H}(m)$ | $H_i(m)$ |
| $\hat{X}(m)$ | $c_i$ |
| $\epsilon_k(m)$ | $E_p^{(b)}(m)$ |
| $\epsilon(m)$ | $E^{(b)}(m)$ |

<Transmitter for Transmitting OFDM Signals>

A description will be given of an OFDM transmitter for transmitting a signal to be received by an OFDM demodulation apparatus according to an eight embodiment.

Figure 19:
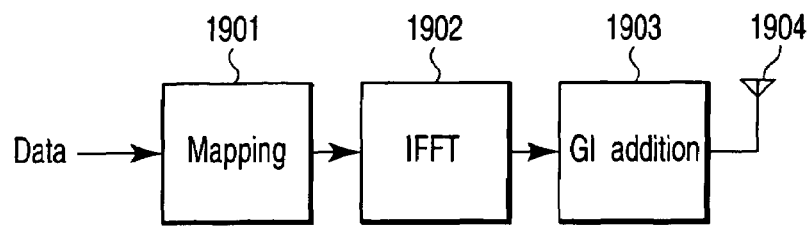
FIG. 19 is a block diagram illustrating an OFDM transmitter for transmitting a signal to be received by OFDM demodulation apparatuses according to eighth and ninth embodiments.

As shown in FIG. 19, the OFDM transmitter comprises a mapping unit 1901, IFFT unit 1902, GI attaching unit 1903 and antenna 1904.

The mapping unit 1901 receives a data stream ("Data" in FIG. 19), and subjects it to modulation using subcarriers.

The IFFT unit 1902 receives modulation signals corresponding to subcarriers, then subjects them to window processing using a rectangular window (the effect of window processing is substantially the same as the effect of the case where no window processing is performed), and subjects them to IFFT.

The time wave x(n) (n: an integer) acquired after IFFT is given by $$x(n) = \frac{1}{L_{FFT}} \sum_{p=0}^{L_{FFT}-1} X(p)e^{\frac{j2\pi np}{L_{FFT}}} \quad (14)$$

where $L_{FFT}$ is the number of FFT points, $X(p)$ is a modulation signal corresponding to the $p^{th}$ ($0 \leq p \leq L_{FFT}-1$) subcarrier, and $\pi$ is the circle constant.

The GI attaching unit 1903 adds a guard interval (GI) to each modulation signal subjected to IFFT. After that, the modulation signals with GIs are transmitted through the antenna 1904. The time wave x'(n) acquired after GI addition is given by $$x'(n) = \begin{cases} x(n) & 0 \leq n \leq L_{FFT}-1 \\ x(L_{FFT}+n) & -L_{GI} \leq n \leq -1 \end{cases} \quad (15)$$

where $L_{GI}$ is the guard interval length.

<Filter Bank and Equalizer for Performing Likelihood Estimation>

Figure 20:
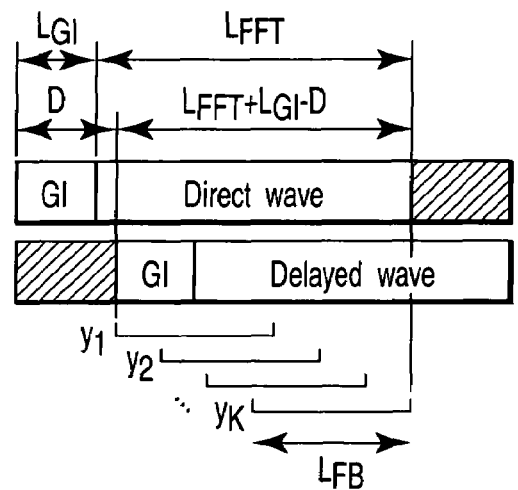
FIG. 20 is a view useful in explaining the concept of the OFDM demodulation apparatus of the eighth embodiment.
Figure 21:
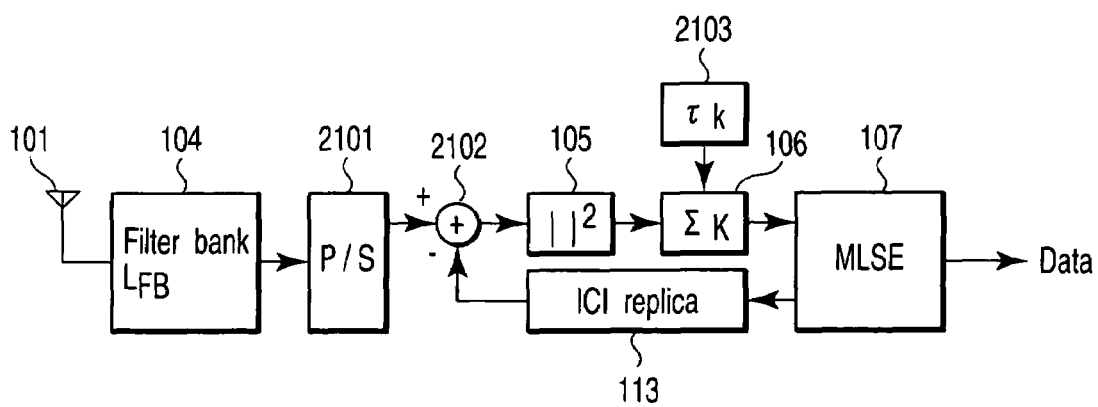
FIG. 21 is a block diagram illustrating an OFDM demodulation apparatus according to the eighth embodiment of the invention.

Referring to FIGS. 20 and 21, the concept of an OFDM demodulation apparatus according to the eighth embodiment will be described. The OFDM demodulation apparatus of the eighth embodiment comprises elements shown in FIG. 20.

In the eighth embodiment, the filter bank 104 performs filter bank processing on a received signal within a period (ISI free period) free from the influence of ISI, and the determination unit (adaptive filter unit) 107 performs MLSE processing on the outputs of the filter bank 104.

A signal y(n) transmitted through a channel corresponding to magnitude (h) of channel estimation value and received by the antenna 101 is given by $$y(n) = h*x'(n) \quad (16)$$

where it is assumed that n=0 corresponds to the leading portion of each effective symbol. Further, for simplification of explanation, noise components are omitted. The ISI-free-period holder 102 (not shown in FIG. 21) determines the period that is free from the influence of ISI. The signal received in the ISI free period ($D-L_{GI} \leq n \leq L_{FFT}-1$) can be rewritten as follows:

$$y(n) = \frac{1}{L_{FFT}} \sum_{p=0}^{L_{FFT}-1} H(p)X(p)e^{\frac{j2\pi np}{L_{FFT}}} \quad (17)$$

where $H(p)$ is the channel characteristic of the $p^{th}$ subcarrier. The filter bank size LFB used by the filter bank 104 is half the effective symbol length $L_{FFT}$. Namely, the filter bank 104 satisfies the relationship given by $$L_{FB}=L_{FFT}/2 \quad (18)$$

The equalization unit 107 uses K filter bank outputs acquired at different times when likelihood computation based on MLSE is performed. K will be referred to as "the likelihood average number". A sample generation unit 2103 generates K different sample times ($\tau_1, \ldots, \tau_K$).

A received signal $y_k(n)$ ($0 \leq n \leq L_{FB}$) in the $k^{th}$ period is given by $$y_k(n)=y(n+\tau_k) \quad (19)$$

where $\tau_1 = D - L_{GI}$. The filter bank 104 generates a signal $Z_k(n)$ acquired by subjecting the signal $Z_k(n)$ to window processing using a window function $w_n$, and subjects it to frequency conversion (e.g., FFT). The signal $Z_k(n)$ is given by $$z_k(n)=w_n y_k(n) \quad (20)$$

Figure 22:
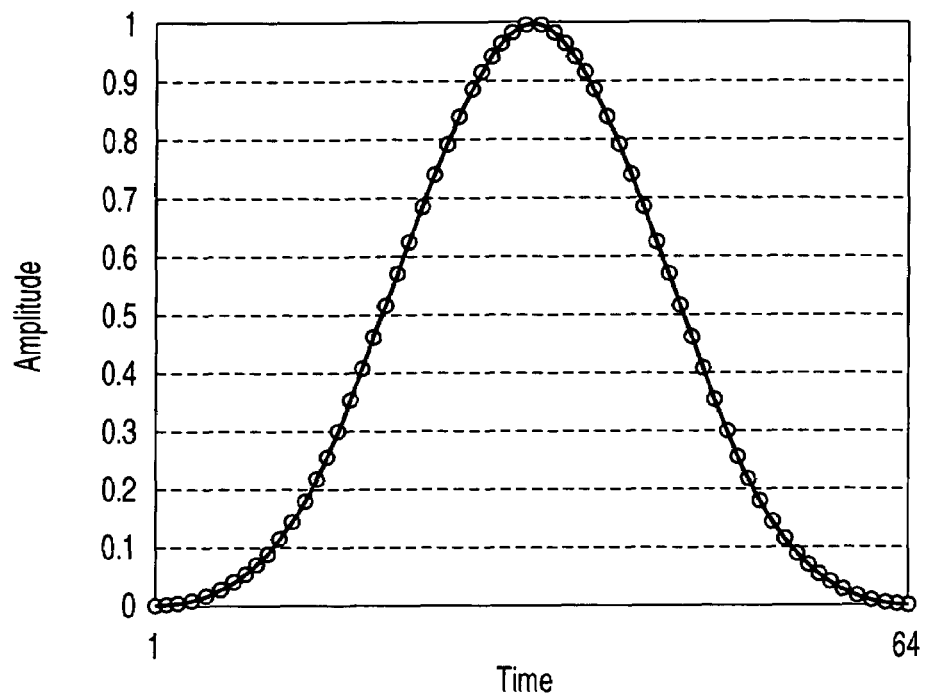
FIG. 22 is a graph illustrating the coefficient of the Blackman window used by the filter bank appearing in FIG. 21.

In the eighth embodiment, the Blackman window is used as the window function. The Blackman window has a slightly wider mean frequency band and a slightly lower sideband level than the Hamming window or Hanning window. The Blackman window coefficients, which are shown in FIG. 22, are given by $$w_n = 0.42 - 0.5\cos\left(\frac{2\pi n}{L_{FB}-1}\right) + 0.08\cos\left(\frac{4\pi n}{L_{FB}-1}\right) \quad (21)$$

$$0 \leq n \leq L_{FB}-1$$

The filter bank 104 subjects, for example, $Z_k(n)$ in the equation (20) to FFT, thereby outputting $Z_k(m)$. $Z_k(m)$ is given by the following equation, based on the equations (14), (17), (18) and (19):

$$Z_k(m) = \frac{1}{L_{FFT}} \sum_{p=0}^{L_{FFT}-1} \left( \sum_{n=0}^{\frac{L_{FFT}}{2}-1} w_n e^{\frac{-j2\pi(2m-p)n}{L_{FFT}}} \right) H(p)X(p)e^{\frac{j2\pi \tau_k p}{L_{FFT}}}$$

$$= \frac{1}{L_{FFT}} \sum_{p=0}^{L_{FFT}-1} \left( \sum_{n=0}^{L_{FFT}-1} w'_n e^{\frac{-j2\pi(2m-p)n}{L_{FFT}}} \right) H(p)X(p)e^{\frac{j2\pi \tau_k p}{L_{FFT}}}$$

$$= \frac{1}{L_{FFT}} \sum_{p=0}^{L_{FFT}-1} W(2m-p)H(p)X(p)e^{\frac{j2\pi \tau_k p}{L_{FFT}}} \quad (22)$$

where the following is satisfied:

$$w'_n = \begin{cases} w_n & 1 \leq n \leq L_{FFT}/2-1 \\ 0 & L_{FFT}/2 \leq n \leq L_{FFT}-1 \end{cases} \quad (23)$$

Figure 23:
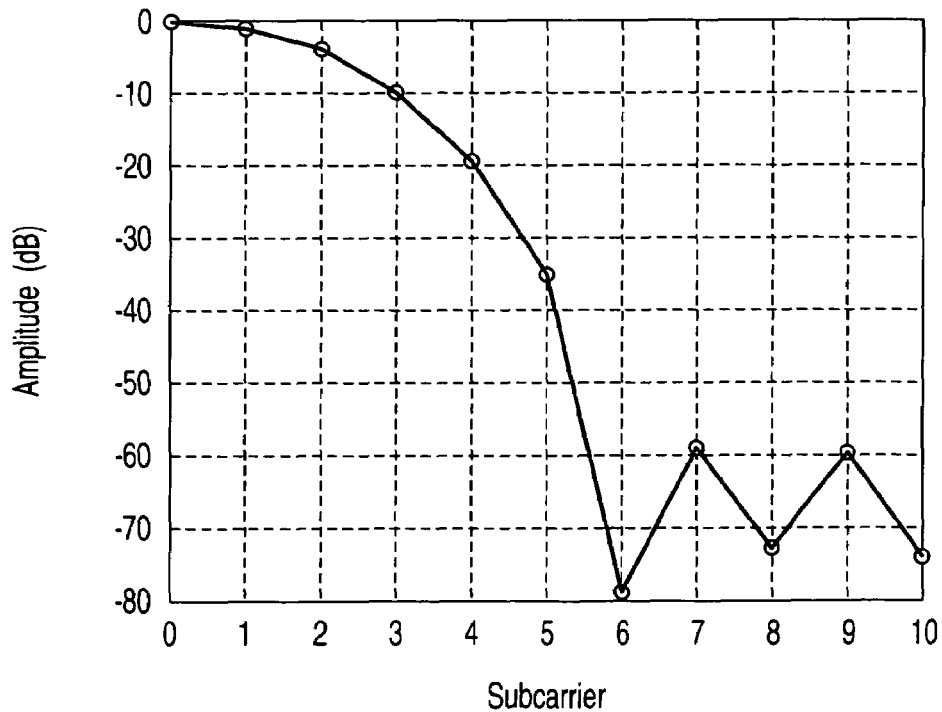
FIG. 23 is a graph illustrating the frequency response of the Blackman window used by the filter bank of FIG. 21.

Further, $W(p)$ represents the frequency response of $W'_n$. FIG. 23 shows the frequency response of the Blackman window.

From the frequency response of the window function, an approximate value of $Z_k(m)$ is given by the following equation, assuming that the range of adjacent subcarriers to be considered for ICI (inter-carrier-interference) is $\alpha$:

$$Z_k(m) \approx \frac{1}{L_{FFT}} \sum_{q=-\alpha}^{+\alpha} W(q)H(2m-q)X(2m-q)e^{\frac{j2\pi \tau_k(2m-q)}{L_{FFT}}} \quad (24)$$

In the eighth embodiment, stream estimation concerning the $2m^{th}$ and $(2m+1)^{th}$ subcarriers is performed using the $m^{th}$ output $Z_k(m)$ ($0 \leq m \leq L_{FFT}/2-1$) of the filter bank 104. The replica generation unit 113 generates a replica corresponding to $Z_k(m)$. The replica corresponding to $Z_k(m)$ is given by $$\hat{Z}_k(m) = \frac{1}{L_{FFT}} \sum_{q=-\alpha}^{+\alpha} W(q)\hat{H}(2m-q)\hat{X}(2m-q)e^{\frac{j2\pi\tau_k(2m-q)}{L_{FFT}}} \quad (25)$$

where hat[X(m)] is a signal stream candidate corresponding to the $m^{th}$ subcarrier, and hat[H(p)] is a channel characteristic candidate corresponding to the $p^{th}$ subcarrier. In the description below, hat[A] indicates the hat of A. A P/S unit 2101 converts, into a serial signal, the outputs of the filter bank 104 as parallel signals. An adder 2102 adds up the output of the P/S unit 2101 and the output (x (−1)) of the replica generation unit 113.

The error computation unit 105 computes the difference between a received signal and its replica, i.e., an error $\epsilon_k(m)$. The error $\epsilon_k(m)$ is given by $$\epsilon_k(m) = Z_k(m) - \hat{Z}_k(m) \quad (26)$$

Subsequently, the error addition unit 106 the sum bar[$\epsilon$] (m) of the errors (likelihood values) acquired at K different times. The sum bar[$\epsilon$] (m) is given by the following equation. In the description below, bar[A] indicates the bar of A.

$$\bar{\varepsilon}(m) = \sum_{k=1}^{K} |\varepsilon_k(m)|^2 \quad (27)$$

The adaptive filter unit 107 performs signal stream estimation using the equation (27).

<Computer Simulation>

Estimation was performed to clarify the filter bank interval (i.e., each interval between $\tau_1, \ldots, \tau_K$) necessary to suppress ICI. In this estimation, Eb/N0=30 dB, $\alpha=3$, and the likelihood average number K and delay time D were used as parameters. Table 2 below shows elements used for simulation.

TABLE 2

| Modulation scheme | QPSK |
| --- | --- |
| Number of FFT points: $L_{FFT}$ | 128 |
| Number of effective carriers | 108 |
| Guard interval length: $L_{GI}$ | 32 |
| Filter bank size: $L_{FB}$ | 64 |
| Window function | Blackman Window |
| Likelihood average number: K | 1, 2, 3, 4, 5, 6, 7 |
| ICI-suppressed range: $\alpha$ | 3 |
| Channel model | Equal-level two-wave Rayleigh |
| Delay time: D | $L_{GI}$ + 6 |
| Maximum Doppler frequency: $f_d$ | 0 Hz (quasi-static fading) |

Further, table 3 below shows set values of $\tau_K$ corresponding to likelihood average numbers K and delay times D. $\tau_1, \tau_2, \ldots$ were set at regular intervals (except for $\tau_K$). The meaning of the hatched portions will be described later. It is assumed that FFT timing synchronization and channel estimation are performed ideally.

TABLE 3

| K | $\tau_1$ | $\tau_2$ | $\tau_3$ | $\tau_4$ | $\tau_5$ | $\tau_6$ | $\tau_7$ |
| --- | --- | --- | --- | --- | --- | --- | --- |
| 1 | 6 | | | | | | |
| 2 | 6 | 64 | | | | | |
| 3 | 6 | 35 | 64 | | | | |
| 4 | 6 | 25 | 44 | 64 | | | |
| 5 | 6 | 20 | 34 | 48 | 64 | | |
| 6 | 6 | 17 | 28 | 39 | 50 | 64 | |
| 7 | 6 | 15 | 24 | 33 | 42 | 51 | 64 |

Figure 24:
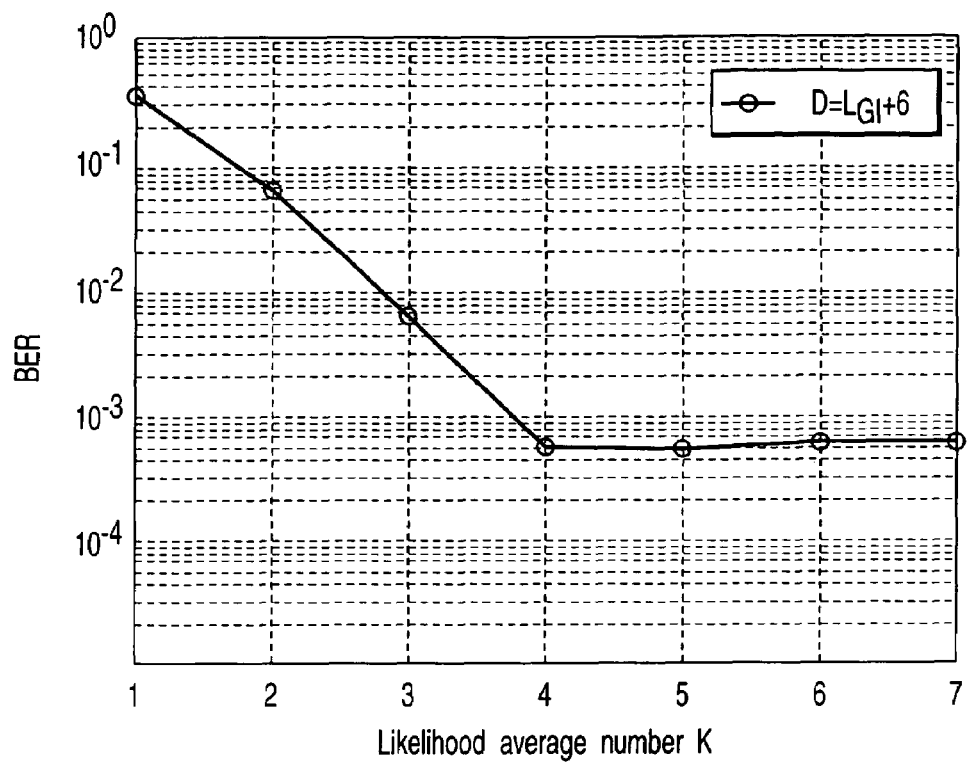
FIG. 24 is a graph illustrating the relationship between a likelihood average value K and a bit error rate in the OFDM demodulation apparatus of FIG. 21.

FIG. 24 shows the relationship between the likelihood average number K and the bit-error-rate characteristic. In the case of D=$L_{GI}$+6, if K is not more than 3, the characteristic is degraded. This is because each of the intervals of $\tau_K$ indicated by the hatched portions shown in table 3 is greater than $L_{FFT}$/6, and vectors $v_k (1 \leq k \leq K)$ given by equation (28) below are linearly dependent on each other in the complex space, which makes it impossible to sufficiently suppress ICI. Each vector $v_k$ in the equation (28) corresponds to the exponential part of the equation (25). From the above, it is understood that the interval of each $\tau_K$ must be set to $L_{FFT}$/6 or less. Namely, it is sufficient if the interval of each $\tau_K$ is set to $1/(2\alpha)$ of the effective symbol length.

$$v_k = \left[ e^{\frac{j2\pi\tau_k(-3)}{L_{FFT}}}, e^{\frac{j2\pi\tau_k(-2)}{L_{FFT}}}, \right. \quad (28)$$

$$\left. e^{\frac{j2\pi\tau_k(-1)}{L_{FFT}}}, 1, e^{\frac{j2\pi\tau_k(1)}{L_{FFT}}}, e^{\frac{j2\pi\tau_k(2)}{L_{FFT}}}, e^{\frac{j2\pi\tau_k(3)}{L_{FFT}}} \right]$$

Ninth Embodiment

In a ninth embodiment, the number of computations for maximum likelihood estimation is reduced. Namely, the ninth embodiment differs from the eighth embodiment in that the former employs the maximum likelihood estimation unit (MLSE) 2501 shown in FIG. 25.

In the eighth embodiment, assuming that a is the ICI suppression range and that the QPSK modulation scheme is employed, the number of states for maximum likelihood estimation corresponding to each filter bank output is $4^{2\alpha+1}$. Accordingly, the order of the number of computations in the eighth embodiment is O ($4^{2\alpha+1} \times L_{FB} \times N_{CA}/L_{FFT}$), where $L_{FFT}$ is the number of FFT points, $L_{FB}$ is the filter bank size, and $N_{CA}$ is the number of effective carriers. In contrast, in the ninth embodiment, maximum likelihood estimation is performed in two stages as described below, thereby reducing the number of states for the estimation, and causing the order of the number of computations to be O ($4^{2(\alpha-1)+1} \times L_{FB} \times N_{CA}/L_{FFT}$).

Figure 25:
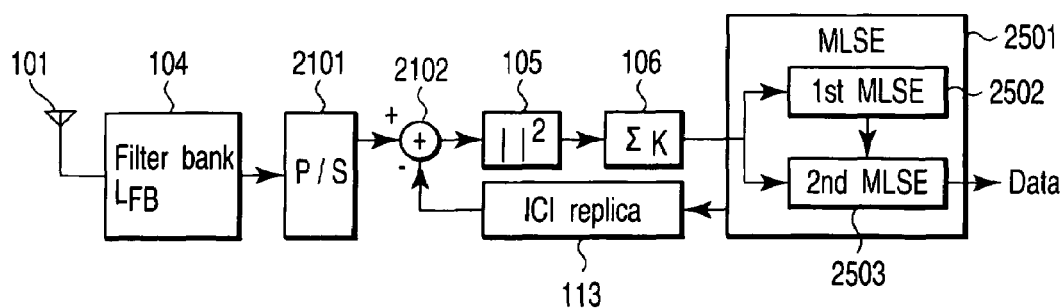
FIG. 25 is a block diagram illustrating an OFDM demodulation apparatus according to a ninth embodiment of the invention.

As shown in FIG. 25, the maximum likelihood estimation unit 2501 of the ninth embodiment employs includes a first maximum likelihood estimation unit 2502 and second maximum likelihood estimation unit 2503. Assuming that $\alpha$ is the ICI suppression range, the first maximum likelihood estimation unit 2502 performs maximum likelihood estimation using, as the ICI suppression range, $\alpha_1$ smaller than $\alpha$. The second maximum likelihood estimation unit 2503 selects replicas corresponding to the range of subcarriers adjacent to a subcarrier that corresponds to $\alpha_2$ ($\alpha_2 < \alpha$) having an area overlapping with $\alpha_1$.

In addition, first replica selection means selects replicas corresponding to the entire range of $\alpha$, and second replica selection means selects determines a final replica based on the replicas selected by the first replica selection means.

Referring to FIG. 26, a description will be given of a specific operation example of the maximum likelihood estimation unit 2501. In FIG. 26, $\alpha=3$, $\alpha_1=2$ and $\alpha_2=2$.

The first maximum likelihood estimation unit 2502 estimates, from a filter bank output Z (m−1), a signal stream of hat[$X_{(m-1)}$(2m−4)], hat[$X_{(m-1)}$(2m−3)], hat[$X_{(m-1)}$(2m−2)], hat[$X_{(m-1)}$(2m−1)] and hat[$X_{(m-1)}$(2m)]. The first maximum likelihood estimation unit 2502 further estimates, from a filter bank output Z (m), a signal stream of hat[$X_{(m)}$ (2m−2)], hat[$X_{(m)}$ (2m−1)], hat[$X_{(m)}$ (2m)], hat[$X_{(m)}$ (2m+1)] and hat [$X_{(m)}$ (2m+2)]. The first maximum likelihood estimation unit 2502 yet further estimates, from a filter bank output Z (m+1), a signal stream of hat[$X_{(m+1)}$ (2m)], hat[$X_{(m+1)}$ (2m+1)], hat [$X_{(m+1)}$ (2m+2)], hat[$X_{(m+1)}$ (2m+3)] and hat[$X_{(m+1)}$ (2m+4)].

Subsequently, the second maximum likelihood estimation unit 2503 estimates, from the filter bank output Z(m), a signal stream of hat[$X_{(m)}$ (2m)] and hat[$X_{(m)}$ (2m+1)], using hat[$X_{(m-1)}$ (2m−3)] and hat[$X_{(m+1)}$ (2m+3)] as temporary determination values, and sets the estimated values as definite values.

<Computer Simulation>

Performance comparison of the eight and ninth embodiments was executed, with $\alpha$, $\alpha_1$ and $\alpha_2$ set to 3, 2 and 2, respectively, the likelihood average number K set to 5, and the other parameters set as shown in table 2.

In FIG. 27, o indicates the characteristics acquired in the eighth embodiment, and + indicates the characteristics acquired in the ninth embodiment. It can be understood from FIG. 27 that there is no great difference between the eighth and ninth embodiments, and hence that in the ninth embodiment, the number of computations can be reduced with the estimation performance maintained.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An orthogonal frequency division multiplexing (OFDM) demodulation apparatus comprising:

an antenna to receive a signal including a holding period, the holding period including part of a period ranging from a leading portion of a delayed wave of a maximum delay time to a trailing portion of a preceding wave;

an estimation unit configured to estimate a channel response of the signal received by the antenna;

a holding unit configured to hold, based on the channel response, a first signal component contained in the holding period, the first signal component including a second signal component which is contained in a period of a preset length which is included in the holding period;

an acquisition unit configured to acquire a set of filter bank outputs by subjecting the second signal component to frequency conversion;

a generation unit configured to generate a plurality of replicas for each of the filter bank outputs, based on the estimated channel response, a frequency response of each of the filter bank outputs, and candidates for a modulation signal corresponding to a subcarrier included in each of the filter bank outputs;

a selection unit configured to select one of the replicas which minimizes a quantity corresponding to differences between components of each of the filter bank outputs and components of the replicas; and a determination unit configured to determine the modulation signal based on the replica selected for each of the filter bank outputs.

2. The apparatus according to claim 1, wherein:

the acquisition unit is configured to acquire a plurality of sets of the filter bank outputs respectively from a plurality of the second signal components, the second signal components being included in the holding period;

the generation unit is configured to generate, for each of sets of the filter bank outputs, the replicas, based on the estimated channel response, the frequency response, positions of the periods, and the candidates;

the selection unit is configured to acquire a sum of the differences which are acquired from the periods, and selects one of the replicas which minimizes the sum.

3. The apparatus according to claim 1, further comprising:

a filter-bank selection unit configured to select one of two frequency-adjacent filter bank outputs included in the filter bank outputs, when a modulation signal of a subcarrier which is simultaneously contained in both the frequency-adjacent filter bank outputs is determined, the selected one of the frequency-adjacent filter bank outputs providing a smaller one of quantities corresponding to the differences between components of each of the filter bank outputs and components of the replicas; and a candidate selection unit configured to select, as the modulation signal, one of the candidates which minimizes the smaller quantity corresponding to the selected one of the frequency-adjacent filter bank outputs.

4. The apparatus according to claim 1, wherein:

number of the filter bank outputs is M ranging from 0 to M-1 (M is a natural number excluding 1);

M modulation-signal determination units similar to and including the determination unit are configured to be provided to the number M of the filter bank outputs; and a plurality of replica selection units similar to and including the selection unit are configured to be provided, one of the replica selection units, which corresponds to an $m^{th}$ (m is an integer, $1 \leq m \leq M-1$) one of the filter bank outputs, refers, as a definite value, a modulation signal selected by one of the M modulation-signal selection units which corresponds to an $(m-1)^{th}$ one of the filter bank outputs.

5. The apparatus according to claim 4, wherein the M replica selection units are configured to start processing using, as number 0, number of one of the filter bank outputs which contains a boundary between a null subcarrier and a modulation subcarrier.

6. The apparatus according to claim 1, wherein:
number of the filter bank outputs is M ranging from 0 to M-1 (M is a natural number excluding 1); and
M replica selection units, which are similar to and include the selection unit, are configured to be provided;
and further comprising:
a first computation unit configured to compute a metric value, as a likelihood value in Viterbi algorithm, corresponding to a $0^{th}$ one of the filter bank outputs, based on a difference corresponding to one of the replica selection units which corresponds to the $0^{th}$ filter bank output;
a second computation unit configured to compute a metric value corresponding to a $1^{st}$ one of the filter bank outputs, based on a difference corresponding to one of the replica selection units which corresponds to the $1^{st}$ filter bank output, and based on the metric value computed by the first computation unit;
a plurality of path selection units configured to select one of combinations of the candidates based on the metric value computed by one of the first computation unit and the second computation unit corresponding to an $m^{th}$ (m is an integer, $0 \leq m \leq M-1$) one of the filter bank outputs, the combinations of the candidates corresponding to a plurality of subcarriers included in the $m^{th}$ filter bank output, each of the combinations having a same value, and the selected one of combinations having a maximum metric value; and
a combination selection unit configured to select a plurality of combinations each of which is the one of the combinations, the one of the combinations being selected in each of M stages (0 to M-1 stage).

7. The apparatus according to claim 1, further comprising a detection unit configured to detect a temporary holding period corresponding to the holding period included in the received signal,
and wherein:
the holding unit is configured to hold a third signal component contained in the temporary holding period,
the acquisition unit is configured to subject the third signal component to inverse Fourier transform in units of sampling times,
the estimation unit includes: an extraction unit configured to extract, from the filter bank outputs, a filter bank output containing a pilot subcarrier component, based on the third signal component; and a time-characteristic estimation unit configured to estimate a time characteristic of the channel response determined under a least square error criterion, based on the filter bank output extracted by the pilot output extraction unit,
the holding unit is configured to hold the signal component contained in the holding period, based on the channel response estimated by the time-characteristic estimation unit; and
the acquisition unit is configured to subject the second signal component to inverse Fourier transform at a plurality of sampling times based on the channel response estimated by the time-characteristic estimation unit.

8. The apparatus according to claim 7, further comprising:
a time-characteristic estimation unit configured to estimate a time characteristic of the channel response determined under the least square error criterion, based on the modulation signal determined by the determination unit, and the filter bank output extracted, by the pilot output extraction unit.

9. The apparatus according to claim 7, further comprising:
a data output extraction unit configured to extract, from the filter bank outputs, a filter bank output containing a data subcarrier component, based on the third signal component; and
a time-characteristic estimation unit configured to estimate a time characteristic of the channel response determined under the least square error criterion, based on the modulation signal determined by the determination unit, and the filter bank output extracted by the data output extraction unit.

10. The apparatus according to claim 7, further comprising:
a data output extraction unit configured to extract, from the filter bank outputs, a filter bank output containing a data subcarrier component, based on the third signal component; and
a frequency response estimation unit configured to estimate a frequency response of the channel response determined under the least square error criterion, based on the modulation signal determined by the determination unit, and the filter bank output extracted by the data output extraction unit.

11. The apparatus according to claim 7, wherein the holding unit is configured to compute the holding period based on a maximum delay time of the channel response estimated by the time-characteristic estimation unit.

12. The apparatus according to claim 2, wherein the generation unit is configured to compute, from $q=-\alpha$ to $q=+\alpha$, an exponential function included in an equation below, a left-hand side of the equation corresponding to the replicas, to set time intervals of the periods in which vectors corresponding to different values of $\tau_k$ are linearly independent of each other in a complex space, assuming that the exponential function of $q=\xi(-\alpha \leq \xi \leq +\alpha)$ is a $\xi^{th}$ component of each of the vectors, $$\hat{Z}_k(m) = \frac{1}{L_{FFT}} \sum_{q=-\alpha}^{+\alpha} W(q)\hat{H}(2m-q)\hat{X}(2m-q)e^{\frac{j2\pi\tau_k(2m-q)}{L_{FFT}}}$$

where $L_{FFT}$ is number of Fourier transform points or number of inverse Fourier transform points if the frequency conversion is Fourier transform or inverse Fourier transform, $W(q)$ is a frequency response of a window function, hat [H(p)] is an estimated value of a channel characteristic of a $p^{th}$ subcarrier, hat [X(m)] is a signal stream candidate for an $m^{th}$ subcarrier, $j^2=-1$, $\pi$ is a circle constant, $\tau_k$ ($k=1,\ldots$) is a sampling time, and a is a range of adjacent subcarriers included in each of the filter bank outputs.

13. The apparatus according to claim 2, wherein each of time intervals of the periods is set to a value not more than $1/(2\alpha)$ of an effective symbol length of the OFDM signal, $\alpha$ indicating a range of adjacent subcarriers contained in each of the filter bank outputs.

14. The apparatus according to claim 1, wherein the selection unit includes:
a first replica selection unit configured to select replicas corresponding to a range $\alpha_1$ ($\alpha_1 < \alpha$) of adjacent subcarriers, a being a range of adjacent subcarriers contained in each of the filter bank outputs; and
a second replica selection unit configured to select, using, as temporary determination values, the replicas selected by the first replica selection unit, replicas corresponding to a range $\alpha_2$ ($\alpha_2 < \alpha$) of adjacent subcarriers, $\alpha_2$ having an area overlapping with the range $\alpha_1$, the first replica selection unit selecting replicas included in the entire range a, the second replica selection unit selecting the replicas based on the replicas selected by the first replica selection unit.

15. An orthogonal frequency division multiplexing (OFDM) demodulation method comprising:

estimating a channel response of a signal including a holding period, the holding period including part of a period ranging from a leading portion of a delayed wave of a maximum delay time to a trailing portion of a preceding wave;

holding, based on the channel response, a first signal component contained in the holding period, the first signal component including a second signal component which is contained in a period of a preset length which is included in the holding period;

acquiring a set of filter bank outputs by subjecting the second signal component to frequency conversion;

generating a plurality of replicas for each of the filter bank outputs, based on the estimated channel response, a frequency response of each of the filter bank outputs, and candidates for a modulation signal corresponding to a subcarrier included in each of the filter bank outputs;

selecting one of the replicas which minimizes a quantity corresponding to differences between components of each of the filter bank outputs and components of the replicas; and determining the modulation signal based on the replica selected for each of the filter bank outputs.

16. A computer readable medium storing an orthogonal frequency division multiplexing (OFDM) demodulation program for causing a computer to execute instructions to perform steps of:

estimating a channel response of a signal including a holding period, the holding period including part of a period ranging from a leading portion of a delayed wave of a maximum delay time to a trailing portion of a preceding wave;

holding, based on the channel response, a first signal component contained in the holding period, the first signal component including a second signal component which is contained in a period of a preset length which is included in the holding period;

acquiring a set of filter bank outputs by subjecting the second signal component to frequency conversion;

generating a plurality of replicas for each of the filter bank outputs, based on the estimated channel response, a frequency response of each of the filter bank outputs, and candidates for a modulation signal corresponding to a subcarrier included in each of the filter bank outputs;

selecting one of the replicas which minimizes a quantity corresponding to differences between components of each of the filter bank outputs and components of the replicas; and determining the modulation signal based on the replica selected for each of the filter bank outputs.

* * * * *